(12) United States Patent
Fujihara

(10) Patent No.: US 12,374,370 B2
(45) Date of Patent: Jul. 29, 2025

(54) MOVING PICTURE EDITING SYSTEM

(71) Applicant: Takayama Kasei Co., Ltd., Yao (JP)

(72) Inventor: Shinji Fujihara, Osaka (JP)

(73) Assignee: TAKAYAMA KASEI CO., LTD., Yao (JP)

( * ) Notice: Subject to any disclaimer, the term of this patent is extended or adjusted under 35 U.S.C. 154(b) by 0 days.

(21) Appl. No.: 18/708,072

(22) PCT Filed: Mar. 24, 2022

(86) PCT No.: PCT/JP2022/014170
§ 371 (c)(1),
(2) Date: May 7, 2024

(87) PCT Pub. No.: WO2023/084806
PCT Pub. Date: May 19, 2023

(65) Prior Publication Data
US 2025/0022489 A1    Jan. 16, 2025

(30) Foreign Application Priority Data
Nov. 15, 2021 (JP) ................. 2021-185842

(51) Int. Cl.
*G10L 13/00* (2006.01)
*G10L 13/047* (2013.01)
(Continued)

(52) U.S. Cl.
CPC .......... *G11B 27/036* (2013.01); *G10L 13/047* (2013.01)

(58) Field of Classification Search
CPC ....... G10L 13/00; G10L 13/047; G11B 27/02; G11B 27/031; G11B 27/036; G11B 27/34;
(Continued)

(56) References Cited

U.S. PATENT DOCUMENTS

2004/0098754 A1* 5/2004 Vella ............... H04N 21/4722
                                                        725/135
2014/0129971 A1* 5/2014 King ................... G06F 16/447
                                                        715/772
(Continued)

FOREIGN PATENT DOCUMENTS

JP          2003-216976 A      7/2003
JP          2006-48465 A       2/2006
(Continued)

OTHER PUBLICATIONS

Notice of Reasons for Refusal dated Feb. 5, 2024, issued in counterpart of Japanese Patent Application No. 2022-049158 with, English Translation. (12 pages).

(Continued)

*Primary Examiner* — Daquan Zhao
(74) *Attorney, Agent, or Firm* — WHDA, LLP

(57) ABSTRACT

There is provided a moving picture editing system capable of greatly improving the workability and convenience of moving picture editing and performing moving picture editing with a high degree of freedom. The present invention includes an administrator terminal 30 and a moving picture editing server 10. The moving picture editing server 10 includes: a first editing screen display unit 111 that causes the administrator terminal 30 to display a first moving picture editing screen including at least a moving picture playback area 131 for playing back a moving picture and a timeline display area 132; a text object placement unit 112 that places a first text object 135 in the timeline display area 132 and accepts text data representing a character string input to the first text object 135; and a first on-screen text display unit 113 that superimposes and displays a character string as a first on-screen text on a moving picture at a playback time of the moving picture corresponding to a (Continued)

position of the first text object 135 placed in the timeline display area 132 on the basis of the text data input to the first text object 135.

8 Claims, 14 Drawing Sheets

(51) Int. Cl.
 *G11B 27/036* (2006.01)
 *G11B 27/02* (2006.01)
 *G11B 27/031* (2006.01)

(58) Field of Classification Search
 CPC .... H04N 21/235; H04N 21/44; H04N 21/854; H04N 5/765; H04N 5/91; H04N 5/92; H04N 5/93
 USPC ....... 386/278, 282, 280, 244, 245, 246, 248, 386/239

See application file for complete search history.

(56) References Cited

U.S. PATENT DOCUMENTS

| | | | |
|---|---|---|---|
| 2017/0289267 A1* | 10/2017 | Eschbach | ................ H04L 67/02 |
| 2019/0104259 A1* | 4/2019 | Angquist | ............... G11B 27/34 |

FOREIGN PATENT DOCUMENTS

| | | |
|---|---|---|
| JP | 2007-96678 A | 4/2007 |
| JP | 2007-173963 A | 7/2007 |
| JP | 2012-182724 A | 9/2012 |
| JP | 2014-140135 A | 7/2014 |
| JP | 2021-61526 A | 4/2021 |
| JP | 2021-141564 A | 9/2021 |

OTHER PUBLICATIONS

Written Opinion of the International Searching Authority (Form PCT/ISA/237) dated Jun. 7, 2022, issued in counterpart International Application No. PCT/JP2022/014170. (5 pages).
International Search Report dated Jun. 7, 2022, issued in counterpart International Application No. PCT/JP2022/014170, with English Translation. (9 pages).

* cited by examiner

[Figure 1]
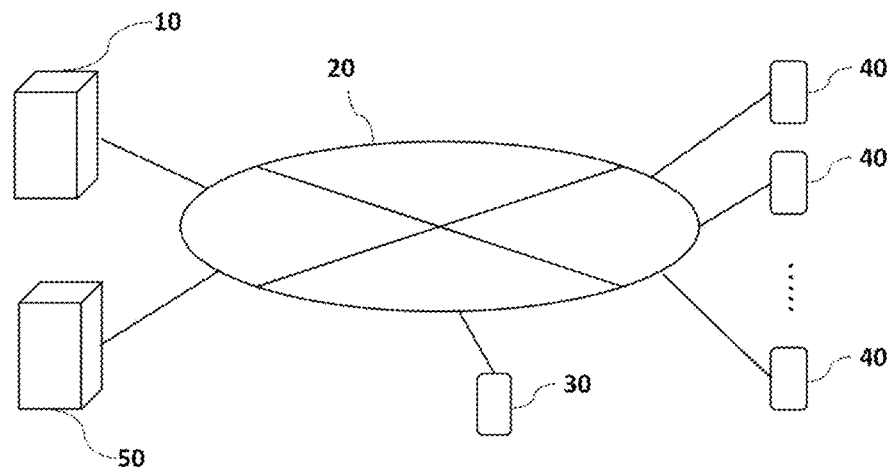
[Figure 2]
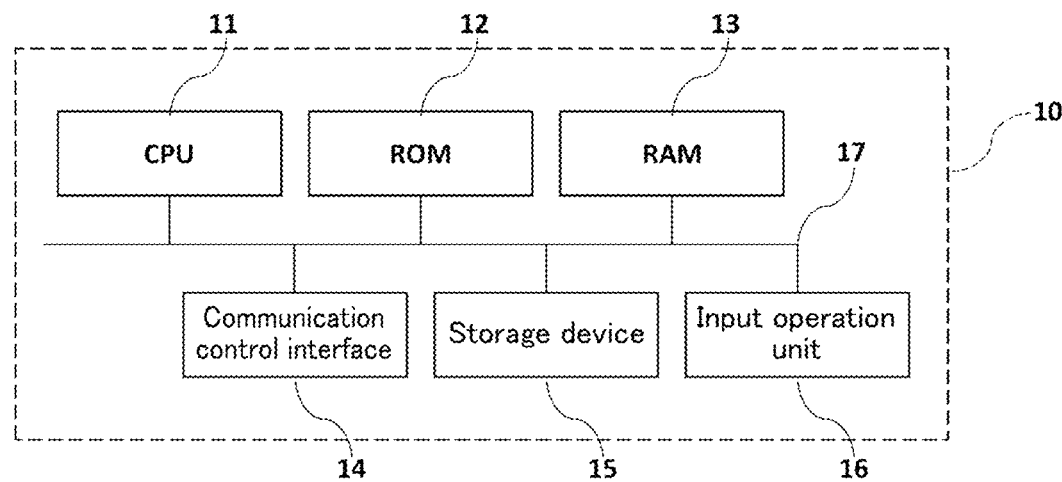

[Figure 3]
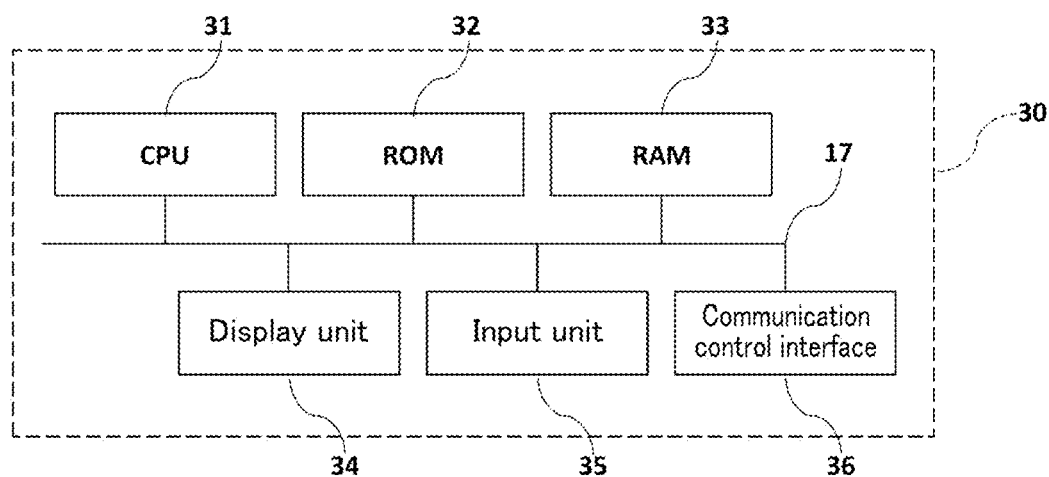

[Figure 4]
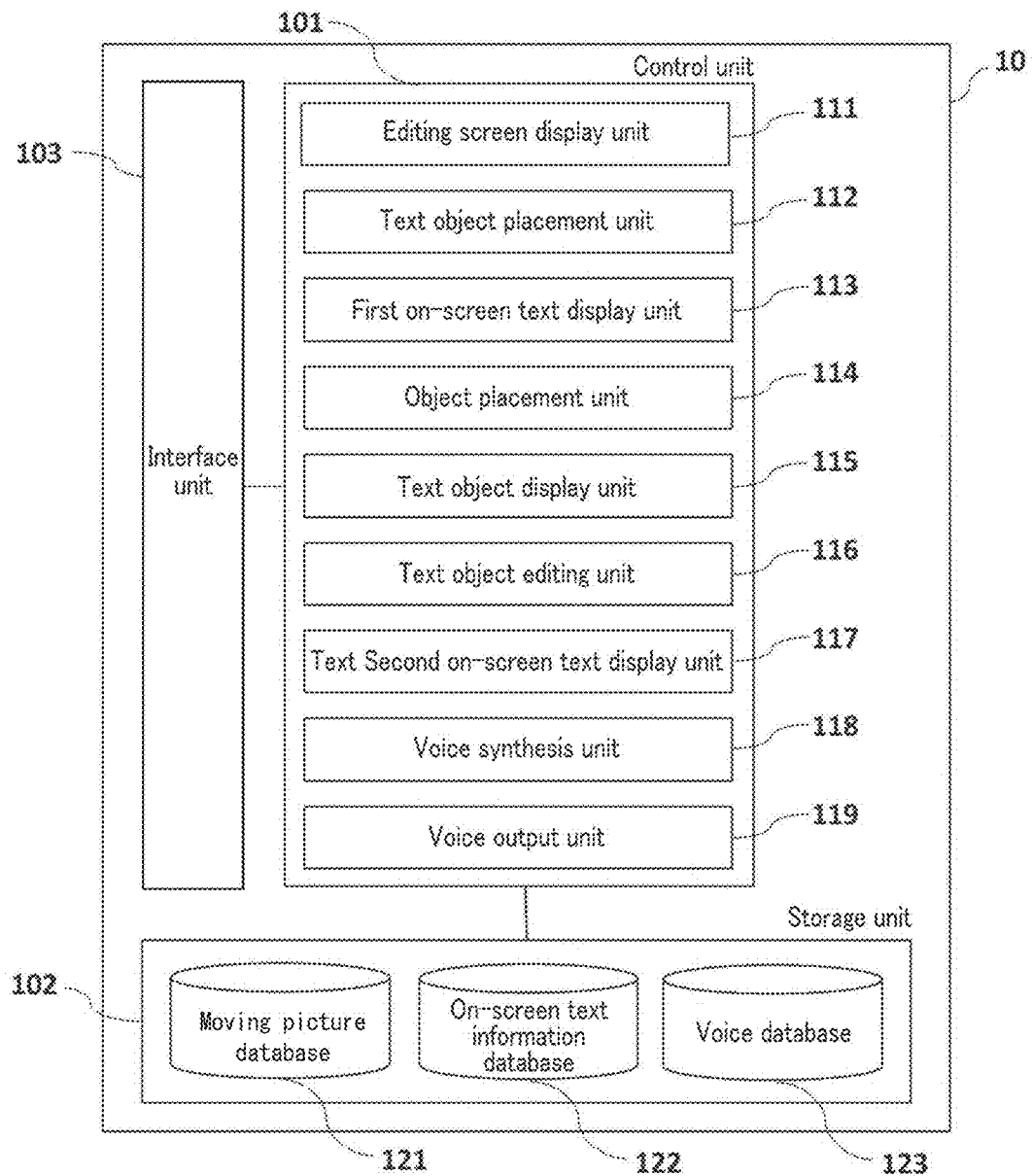

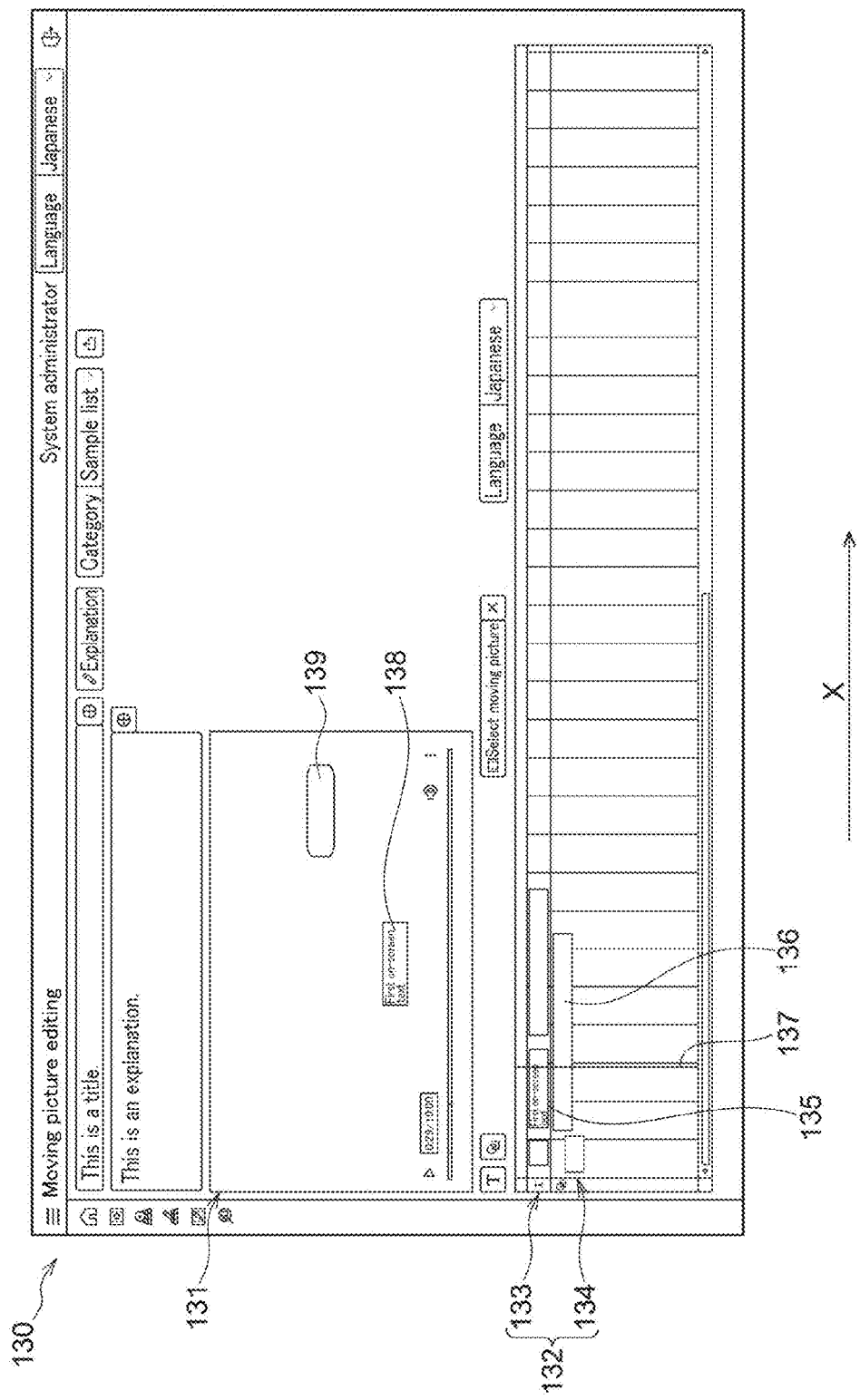
[Figure 5]

[Figure 6]
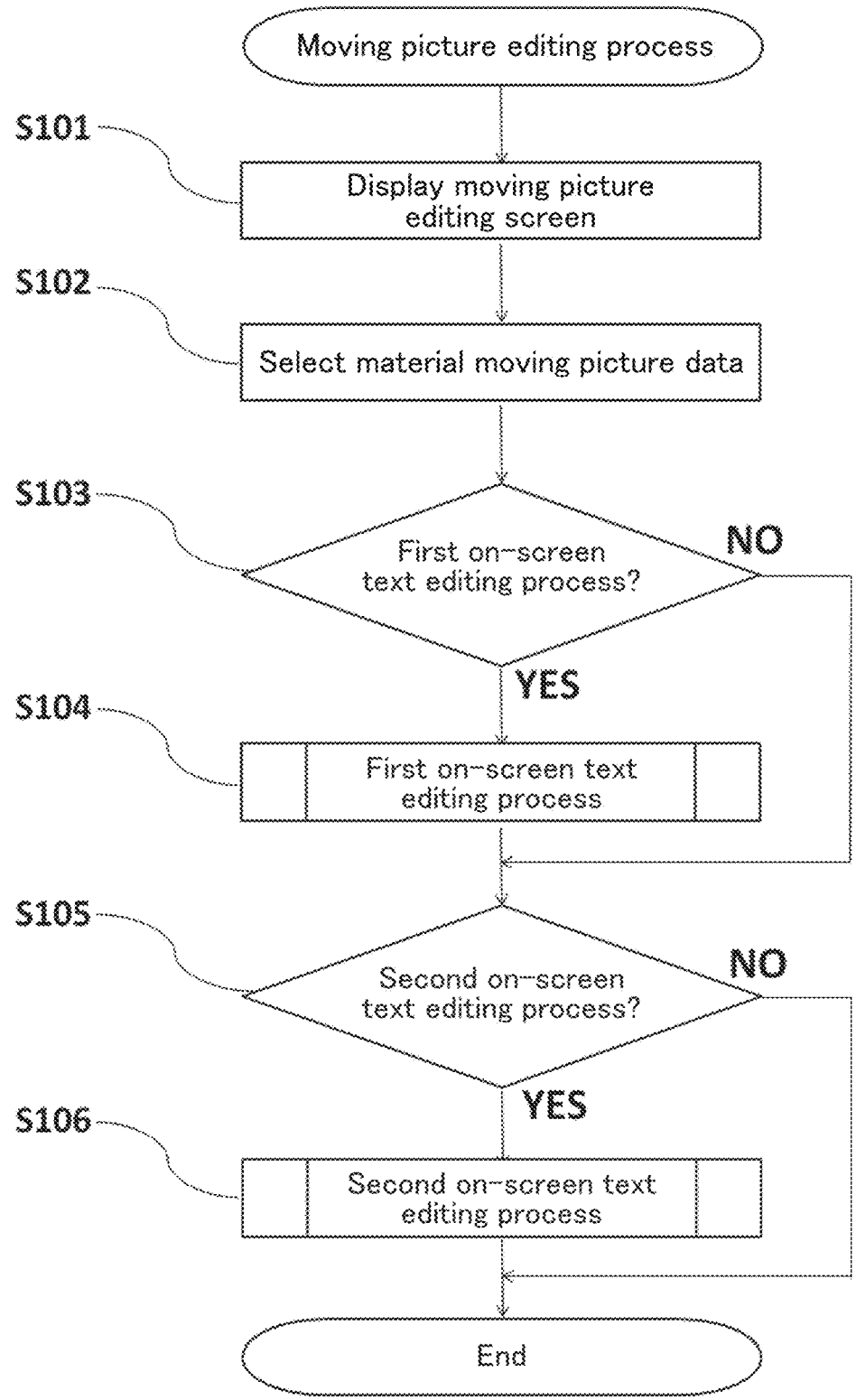

[Figure 7]
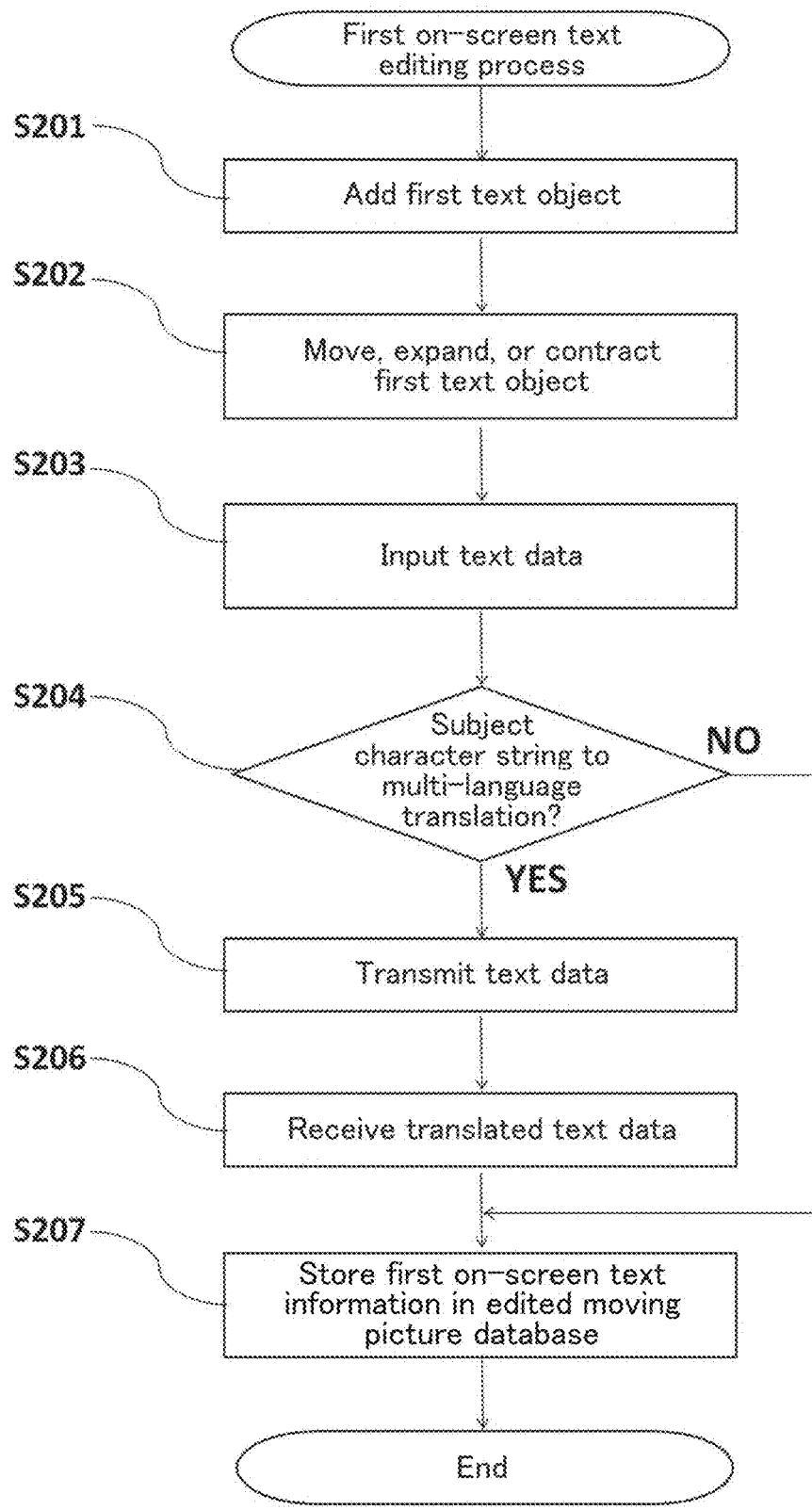

[Figure 8]
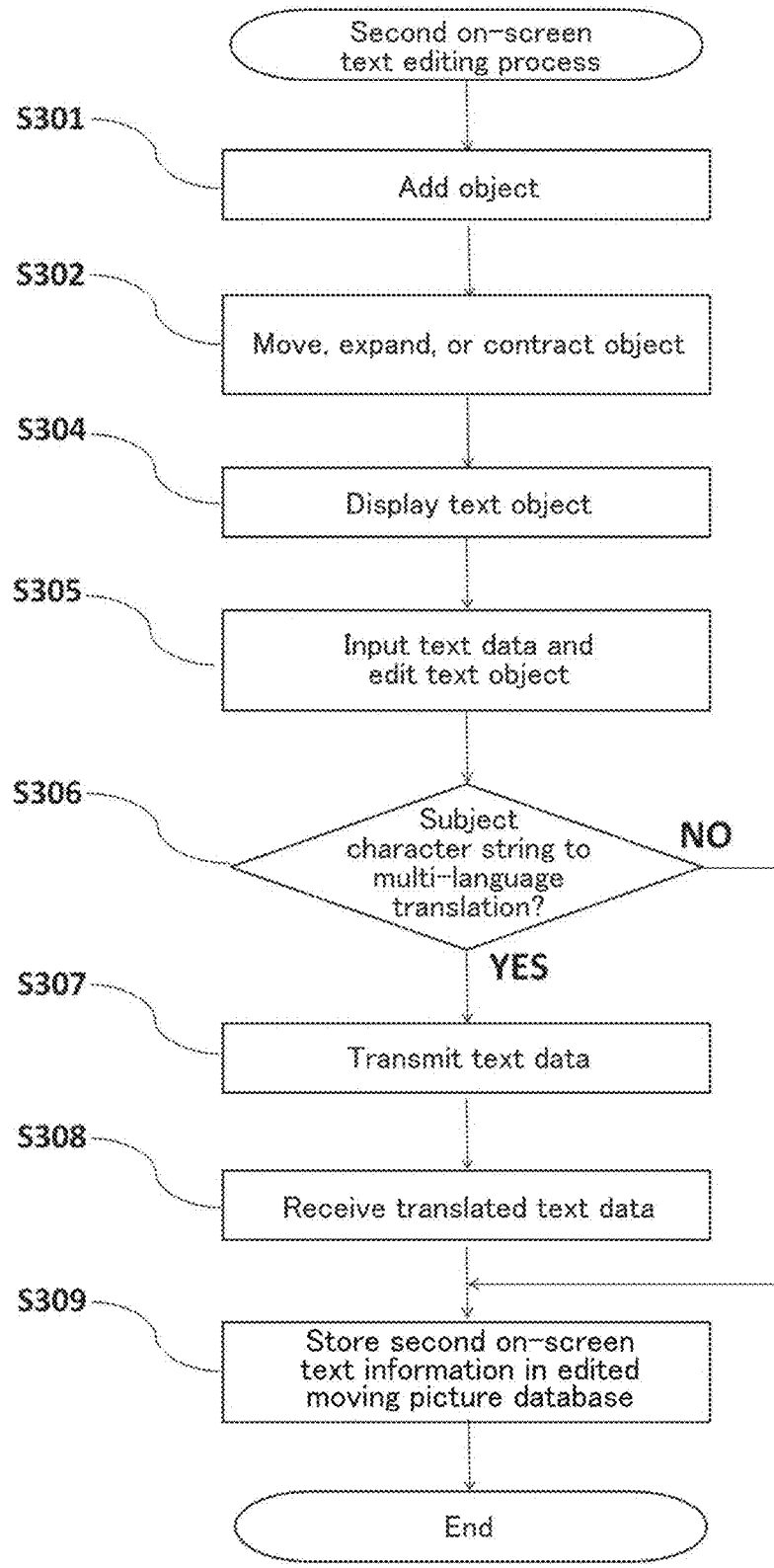

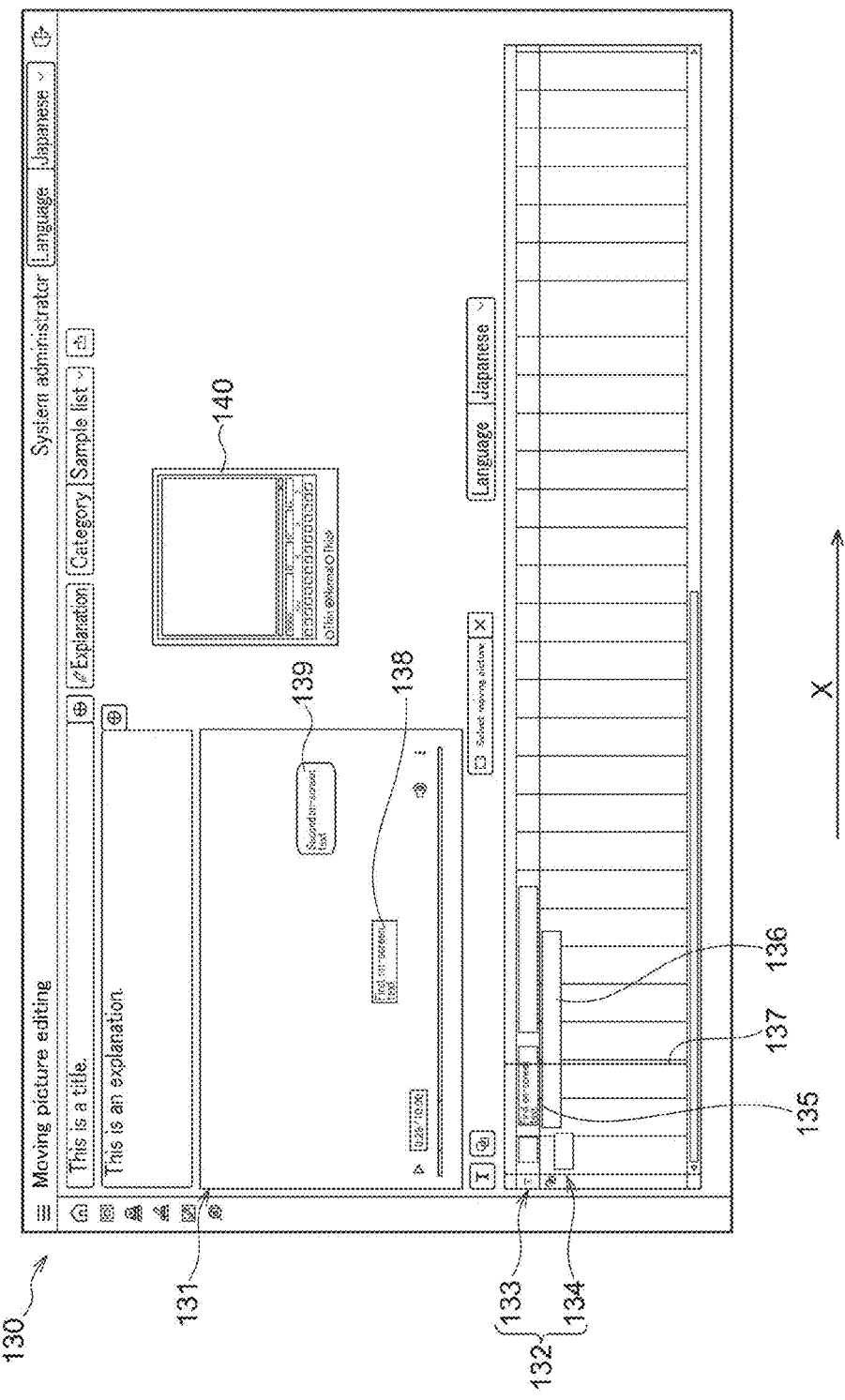

[Figure 10]
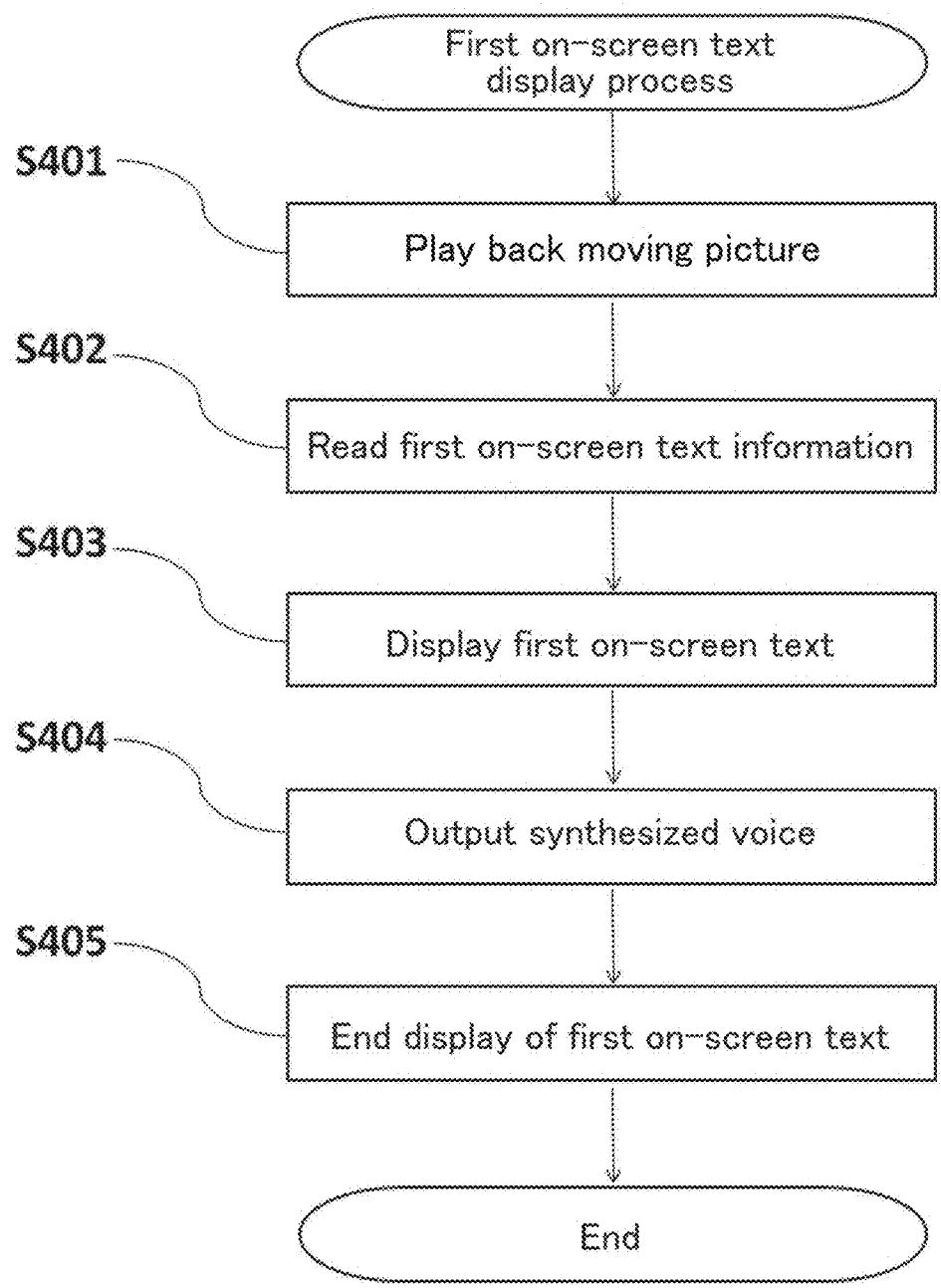

[Figure 11]
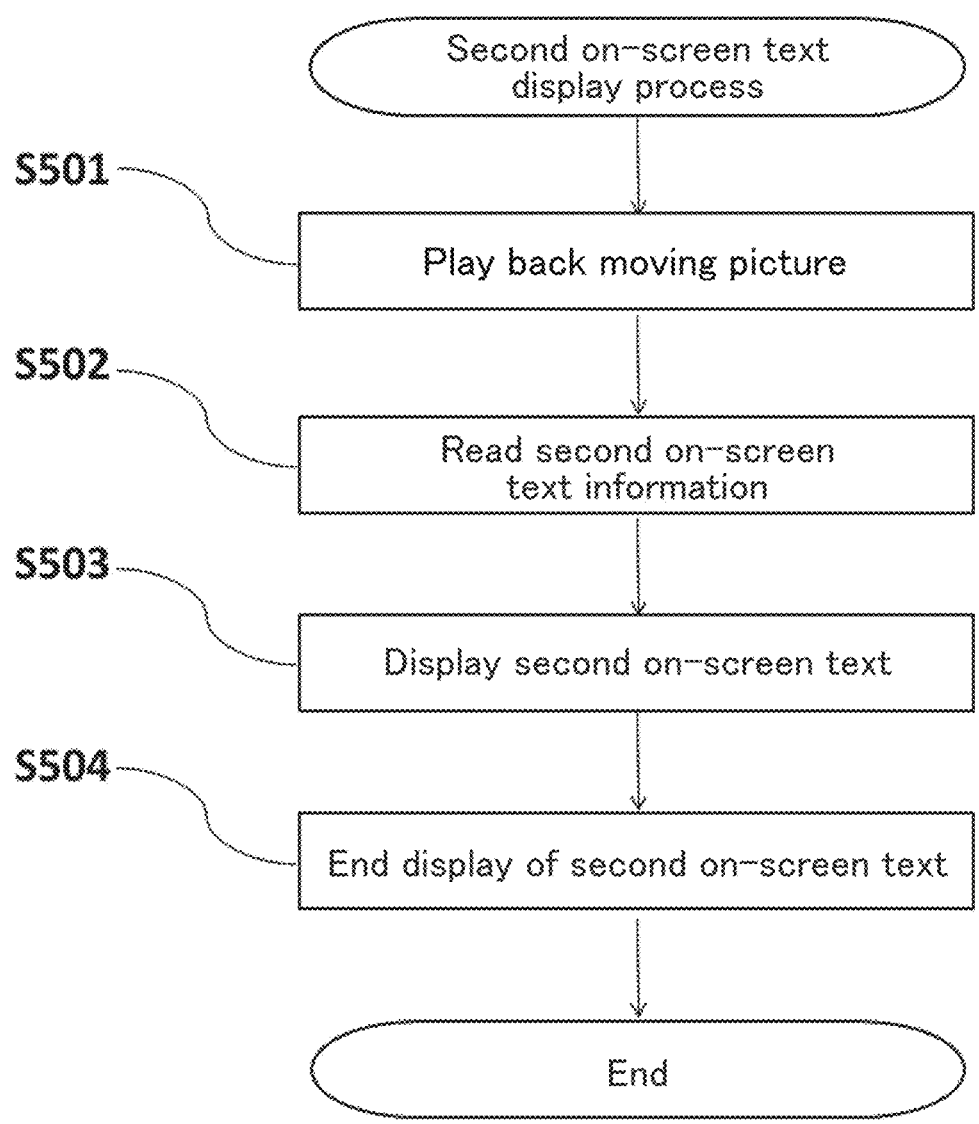

[Figure 12]
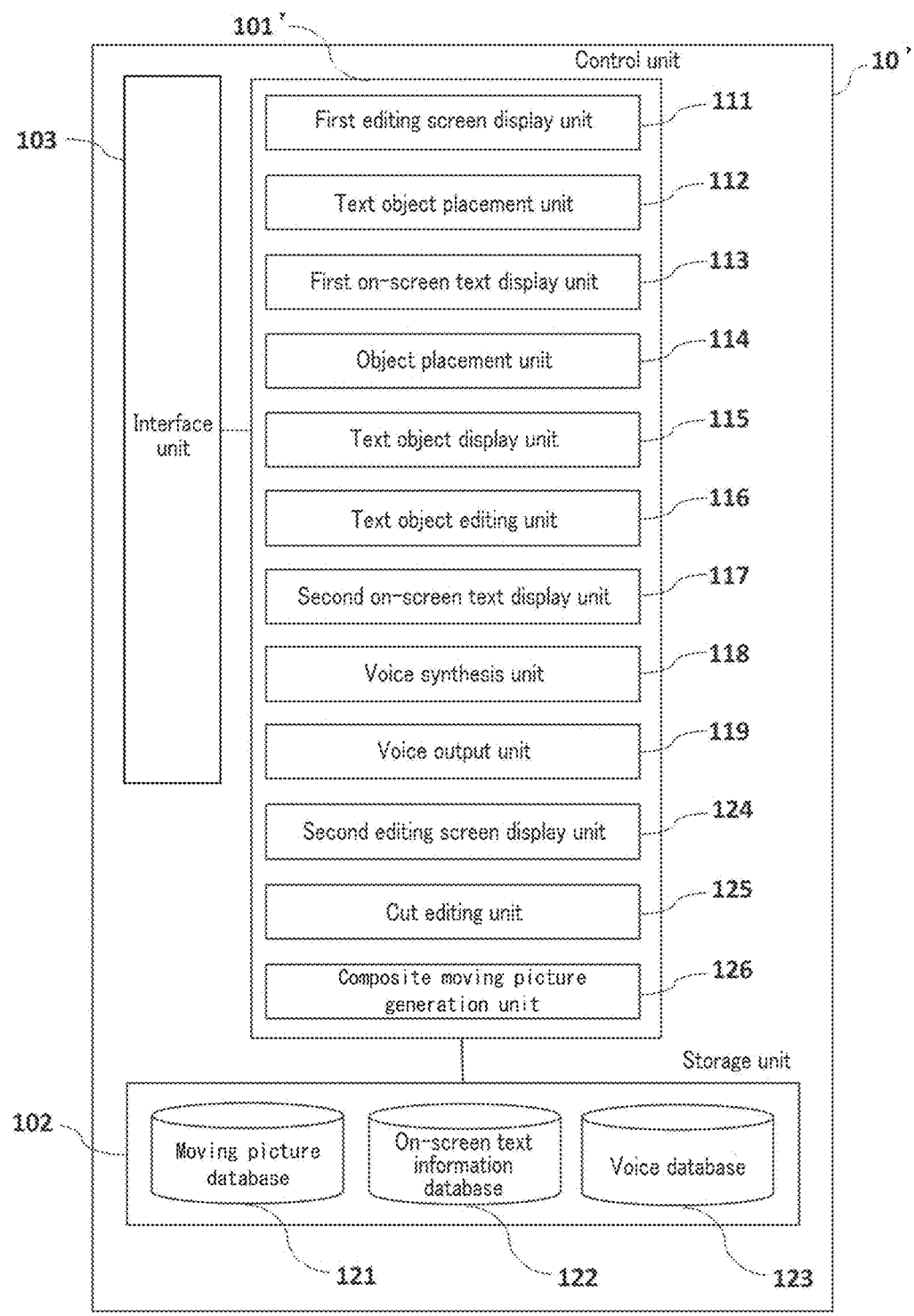

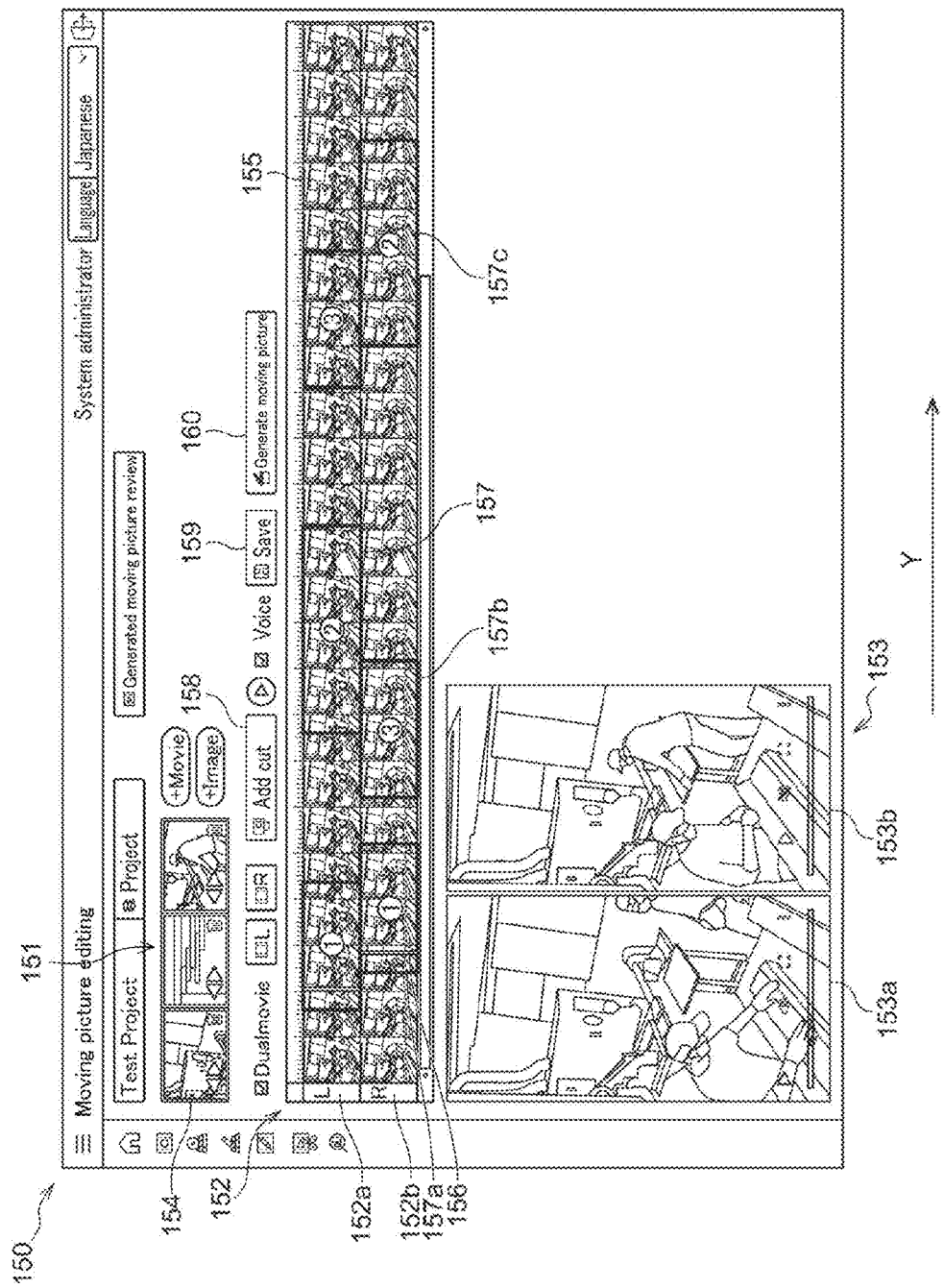

[Figure 14]
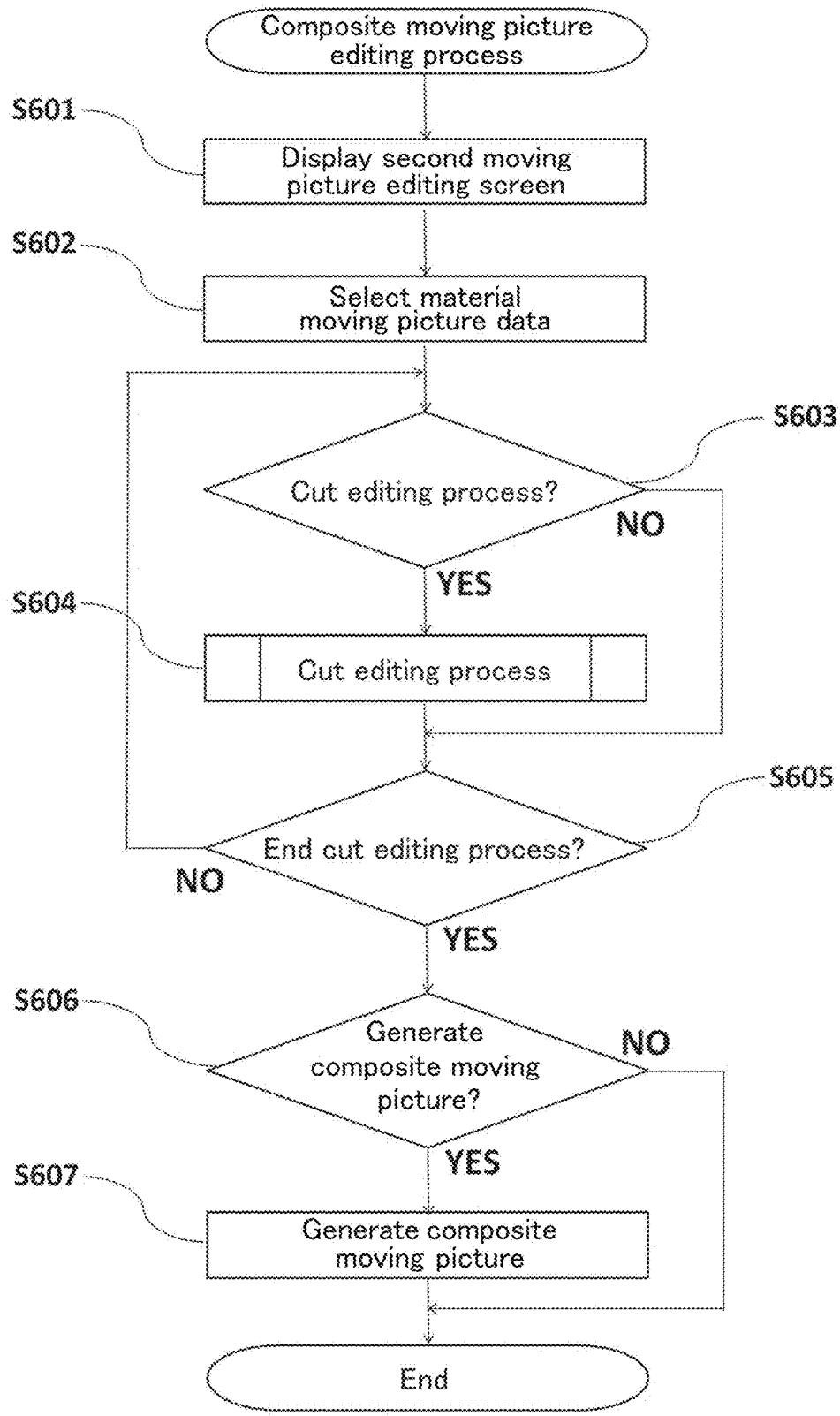

[Figure 15]
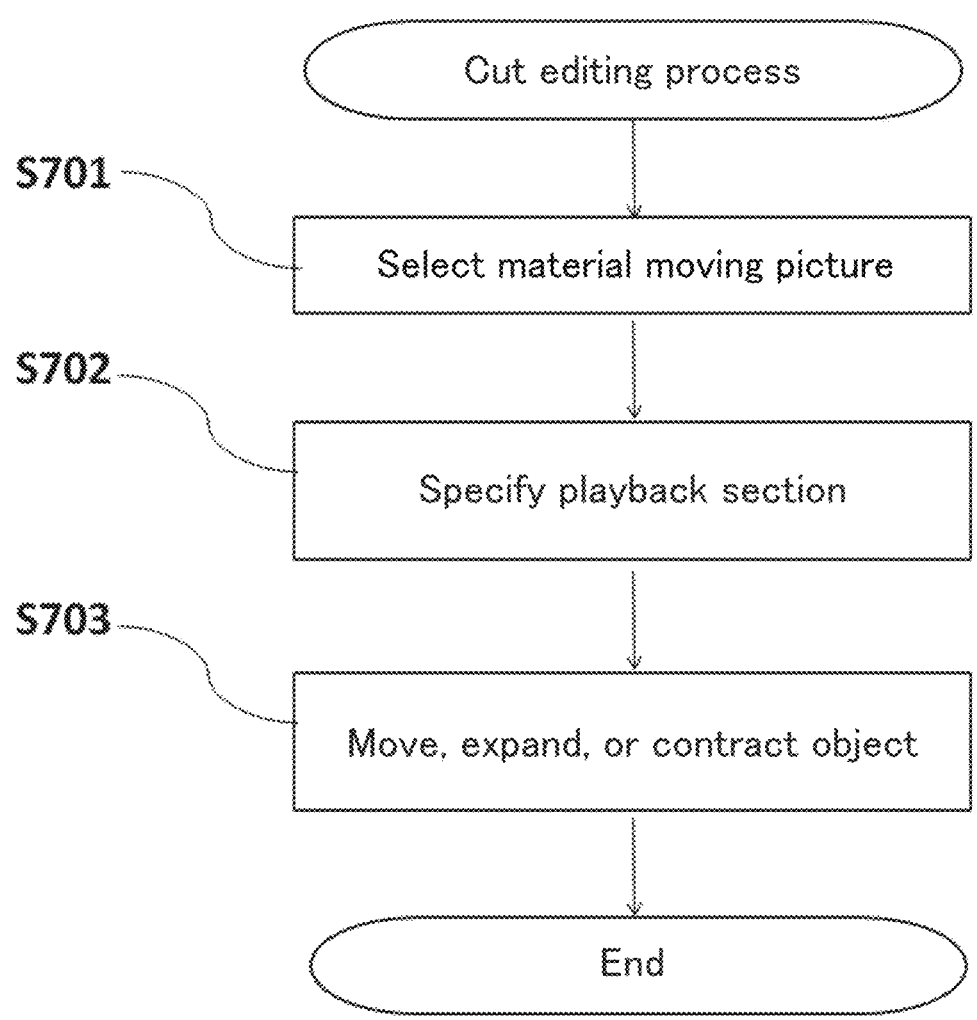

MOVING PICTURE EDITING SYSTEM

TECHNICAL FIELD

The present invention relates to a moving picture editing system capable of superimposing and displaying text and voice on an arbitrary moving picture (video image) through a simple editing operation on a user terminal.

BACKGROUND ART

In recent years, with an increase in the number of foreign workers in Japan, there has been an increase in companies having problems related to communication with foreign workers, training, and technical instruction. In particular, it is difficult to provide foreign workers with technical guidance or the like in Japanese on the specific terminology and the like used at manufacturing sites, and an excessive burden is imposed on those providing technical guidance. On the other hand, some survey results show that it is useful to utilize a work manual using moving pictures or still images in technical instruction for foreign workers, and the like.

In creating a work manual using moving pictures or the like, an editing process may be performed on a captured moving picture using moving picture editing software that runs on a computer. The editing process may include adding various types of information obtained by image capturing or recording, additional information such as content and a title, and voice output to the moving picture.

However, the editing process for a moving picture requires video image editing techniques, knowledge of Hypertext Markup Language (HTML) and Flash, and the like. In a conventional moving picture editing system, when these techniques, knowledge, or the like are not learned, it is difficult to produce and edit moving picture content, and even when these techniques and the like are learned, it takes a lot of time and effort to perform the moving picture editing process, and it is difficult to easily perform moving picture editing.

In this regard, for example, Patent Document 1 discloses a content generation system in which a rule for placing content material information on a layout is predetermined and held, and content material information is automatically placed according to the rule to generate content. Accordingly, the user can automatically generate the content only by applying the rule to the prepared content material. In addition, content can be easily created without special knowledge and techniques for content generation, and can be freely played back without being restricted by time conditions.

However, in the content generation system described in Patent Literature 1, when the content material information is placed on the layout, it is necessary to perform the editing process according to the predetermined rule, thus causing a problem with a low degree of the user's freedom in moving picture editing.

PRIOR ART DOCUMENT

Patent Document

Patent Document 1: JP 2006-48465 A

SUMMARY OF THE INVENTION

Problems to be Solved by the Invention

The present invention has been made in view of the above problems, and an object of the present invention is to provide a moving picture editing system capable of greatly improving workability and convenience of moving picture editing and performing moving picture editing with a high degree of freedom.

Solutions to the Problems

To solve the above problems, a moving picture editing system according to the present invention is a moving picture editing system comprising at least: an administrator terminal; and a moving picture editing server connected to the administrator terminal via a network. The moving picture editing server includes: a first editing screen display unit that causes the administrator terminal to display a first moving picture editing screen including at least a moving picture playback area in which a moving picture is played back and a timeline display area in which a timeline for a playback time of the moving picture is displayed; a text object placement unit that places at least one first text object at an arbitrary position in the timeline display area according to a request from the administrator terminal, and accepts text data representing a character string input to the first text object; and a first on-screen text display unit that superimposes and displays the character string on the moving picture being played back as a first on-screen text at a playback time of the moving picture corresponding to a position of the first text object placed in the timeline display area on a basis of the text data input to the first text object.

In the above configuration, it is preferable that the first editing screen display unit further display an object placement area enabling placement of an object at an arbitrary position in the timeline display area on the administrator terminal, and that the moving picture editing server further include an object placement unit that places at least one object at an arbitrary position in the object placement area in response to a request from the administrator terminal, a text object display unit that causes a second text object to be superimposed and displayed on the moving picture at a playback time of the moving picture corresponding to a position of the object placed in the object placement area, a text object editing unit that accepts, in response to a request from the administrator terminal, an input of text data representing a character string into the second text object superimposed and displayed on the moving picture by the text object display unit, and a second on-screen text display unit that superimposes and displays the character string accepted by the text object editing unit on the moving picture being played back as a second on-screen text at a playback time of the moving picture corresponding to a position of the second text object placed in the object placement area.

Moreover, the above configuration further comprises a multi-language translation server connected to the moving picture editing server via the network. The text object placement unit and the text object editing unit transmit text data representing a character string input to the first text object or the second text object to the multi-language translation server, the multi-language translation server translates the text data into at least one language different from a language of the character string on a basis of the text data received from the text object placement unit or the text object editing unit, and transmits text data representing the translated character string to the moving picture editing server, and the first on-screen text display unit and the second on-screen text display unit each superimpose and display the translated character string as a first on-screen text or a second on-screen text on the moving picture being played back on a basis of text data representing the translated character string received from the multi-language translation server.

Further, in the above configuration, the moving picture editing server may further include a storage unit that stores sound information for voice synthesis, a voice synthesis unit that reads the sound information stored in the storage unit and generates a synthesized voice corresponding to text data representing the character string input to the first text object or text data representing the translated character string, and a voice output unit that outputs the voice synthesized by the voice synthesis unit in synchronization with the superimposed display of the first on-screen text by the first on-screen text display unit.

In the above configuration, the text object placement unit adjusts a superimposed display time of the first on-screen text to be superimposed and displayed on the moving picture by expanding or contracting an area of the first text object placed at an arbitrary position in the timeline display area.

In the above configuration, the object placement unit adjusts a superimposed display time of the second on-screen text to be superimposed and displayed on the moving picture by expanding or contracting an area of the object placed at an arbitrary position in the object placement area.

In the above configuration, the moving picture editing server may further include a second editing screen display unit that calls material moving picture data stored in the storage unit, and causes the administrator terminal to display a second moving picture editing screen on which a plurality of frame images constituting the material moving picture data are placed and displayed in chronological order, and a cut editing unit that specifies a range of a partial section including one or more frame images with respect to the plurality of frame images placed and displayed in chronological order on the second moving picture editing screen, to delete a section not subjected to range specification.

Further, in the above configuration, it is preferable that the second editing screen display unit call a plurality of pieces of the material moving picture data from the storage unit, and place and display a plurality of frame images constituting the material moving picture data in chronological order, and that the moving picture editing server further include a composite moving picture generation unit that generates a composite moving picture to be played back in synchronization in one screen on a basis of the plurality of pieces of material moving picture data called by the second editing screen display unit.

Moreover, in the above configuration, when a length of the section subjected to range specification is changed with respect to a plurality of frame images constituting one arbitrary material moving picture in the composite moving picture, the cut editing unit also synchronously changes a length of a section corresponding to the section subjected to range specification for a plurality of frame images constituting another material moving picture.

Effects of the Invention

According to the present invention, by placing the text object at an arbitrary position in the timeline display area where the timeline for the playback time of the moving picture is displayed, it is possible to superimpose and display the character string input to the text object as the first on-screen text in the moving picture to be played back. In addition, the time at which the first on-screen text is superimposed and displayed can be easily set by adjusting the placement position of the object in the timeline display area.

That is, according to the present invention, it is possible to provide a moving picture editing system capable of greatly improving the workability and convenience of moving picture editing and performing moving picture editing with a high degree of freedom.

BRIEF DESCRIPTION OF THE DRAWINGS

FIG. 1 is a conceptual diagram illustrating an example of a configuration of a moving picture editing system according to Embodiment 1 of the present invention.

FIG. 2 is a block diagram illustrating a hardware configuration of a moving picture editing server according to Embodiment 1 of the present invention.

FIG. 3 is a block diagram illustrating a hardware configuration of an administrator terminal according to Embodiment 1 of the present invention.

FIG. 4 is a block diagram illustrating an example of a functional configuration of a moving picture editing server according to Embodiment 1 of the present invention.

FIG. 5 is an explanatory view illustrating a first moving picture editing screen displayed on the administrator terminal.

FIG. 6 is a flowchart illustrating a flow of a moving picture editing process performed by an administrator.

FIG. 7 is a flowchart illustrating a flow of a first on-screen text editing process in a moving picture editing process.

FIG. 8 is a flowchart illustrating a flow of a second on-screen text editing process in a moving picture editing process.

FIG. 9 is an explanatory view illustrating how a second text object is edited in the first moving picture editing screen.

FIG. 10 is a flowchart illustrating a flow of a first on-screen text display process during the playback of the edited moving picture.

FIG. 11 is a flowchart illustrating a flow of a second on-screen text display process during the playback of the edited moving picture.

FIG. 12 is a block diagram illustrating an example of a functional configuration of a moving picture editing server according to Embodiment 2 of the present invention.

FIG. 13 is an explanatory view illustrating a second moving picture editing screen displayed on the administrator terminal.

FIG. 14 is a flowchart illustrating a flow of a composite moving picture editing process performed by the administrator.

FIG. 15 is a flowchart illustrating a flow of a cut editing process.

EMBODIMENTS OF THE INVENTION

Embodiment 1

[Moving Picture Editing System]

First, a moving picture editing system according to Embodiment 1 of the present invention will be described below.

<Overall Configuration of Moving Picture Editing System>

As illustrated in FIG. 1, the moving picture editing system according to the present Embodiment 1 is configured such that a moving picture editing server 10, an administrator terminal 30 used by an administrator, a user terminal 40 used by a user, and a multi-language translation server 50 are communicably connected to each other via a network 20. FIG. 1 is a conceptual diagram illustrating an example of a configuration of a moving picture editing system according to the present Embodiment 1.

The moving picture editing server 10 is implemented, for example, by executing a moving picture editing program in a workstation, a personal computer, or another computer device. The moving picture editing server 10 stores moving picture data, voice data, and the like, and enables moving picture editing such as superimposing and displaying an on-screen text on moving picture content serving as material in response to a request from the administrator terminal 30. Further, the moving picture editing server 10 enables the playback of the edited moving picture content in response to a request from the user terminal 40.

In the present specification, a "moving picture" means a sequence of a plurality of still images (frame images). The "moving picture" includes, for example, a moving picture displayed on a display device such as a computer system, a handheld computer, a mobile phone, or a television. The moving picture displayed on a display device such as a computer includes, for example, a moving picture in a virtual three-dimensional space or a moving picture distributed via a network. Examples of the moving picture may include, for example, a moving picture image of a television in addition to a moving picture image captured in a company, a home, or the like.

"Moving picture data" means the data of the moving picture. The moving picture data may be recorded in the moving picture editing server 10 in the form of digital data, for example. In addition, "on-screen text" means a character string (including numbers, symbols, signs, etc.) superimposed and displayed on moving picture (video image) content. The "on-screen text" in the present invention can also be referred to as a caption, a subtitle, a ticker, an alert, superimpose, or the like.

The hardware configuration of the moving picture editing server 10 is specifically, for example, as follows. That is, as illustrated in FIG. 2, the moving picture editing server 10 includes at least a central processing unit (CPU) 11, a read-only memory (ROM) 12, a random-access memory (RAM) 13, a communication control interface 14, a storage device 15, and an input operation unit 16. As illustrated in FIG. 2, these components are communicably connected to each other via a path 17. Note that FIG. 2 is a block diagram illustrating the hardware configuration of the moving picture editing server.

The CPU 11 performs various arithmetic processing and the like to control the entire moving picture editing server 10. More specifically, the CPU 11 reads a moving picture editing program from the ROM 12 and executes the moving picture editing program using the RAM 13 as a work area, thereby controlling the operation of each component of the moving picture editing server 10. The ROM 12 is a read-only memory and stores, for example, an initial program to be executed by the CPU 11 when the moving picture editing server 10 is activated. The RAM 13 is a writable volatile memory, and temporarily stores a program, data, and the like being executed. The communication control interface 14 controls the transmission of data to the outside and the reception of data from the outside. The moving picture editing server 10 is communicably connected to the network 20 via the communication control interface 14. The storage device 15 includes, for example, a magnetic disk device or the like, and stores various programs and various data to be held even when the moving picture editing server 10 is powered off. Specifically, the input operation unit 16 is a keyboard, a mouse, or the like, and accepts an input operation by the administrator or the like.

The network 20 is implemented by using various means such as the Internet, a dedicated line, a wide area network (WAN), a light line network, a wireless network, a public line network, and a mobile phone network. Moreover, the network 20 may establish Internet communication with improved security by using a virtual dedicated network technology such as a virtual private network (VPN).

The administrator terminal 30 is implemented by a mobile terminal device such as a mobile phone, a smartphone, a personal handy-phone system (PHS), and a personal digital assistant (PDA), an information processing device such as a desktop type or a notebook type personal computer, and the like. The administrator terminal 30 is preferably equipped with an Internet browser or the like to implement the moving picture editing system of the present Embodiment 1. The hardware configuration of the administrator terminal 30 includes at least a CPU 31, a ROM 32, a RAM 33, a display unit 34, an input unit 35, and a communication control interface 36, for example, as illustrated in FIG. 3. FIG. 3 is a block diagram illustrating the hardware configuration of the administrator terminal 30.

The CPU 31 performs various arithmetic processing and the like to control the entire administrator terminal 30. More specifically, the CPU 31 reads a computer program from the ROM 32 and executes the computer program using the RAM 33 as a work area, thereby controlling the operation of each component of the administrator terminal 30. The ROM 32 is a writable nonvolatile memory, and can store various programs and various data to be held even when the power of the administrator terminal 30 is turned off. The RAM 33 is a writable volatile memory, and can temporarily store a program, data, and the like being executed. The display unit 34 is implemented by, for example, a display including liquid crystal, organic electro luminescence (EL), or the like, a monitor, a touch panel, or the like. The communication control interface 36 controls data transmission from the administrator terminal 30 to the outside and controls data reception from the outside to the administrator terminal 30. The administrator terminal 30 is communicably connected to the network 20 via the communication control interface 36.

The user terminal 40 is implemented by a mobile terminal device such as a mobile phone, a smartphone, a PHS, and a PDA, an information processing device such as a desktop type or a notebook type personal computer, and the like. In the moving picture editing system of the present Embodiment 1, at least one user terminal 40 only needs to be provided, or a plurality of user terminals may be provided. The user terminal 40 is preferably equipped with an Internet browser or the like to implement the moving picture editing system of the present Embodiment 1. Similarly to the administrator terminal 30, the hardware configuration of the user terminal 40 can adopt a hardware configuration including at least a CPU, a ROM, a RAM, a display unit, an input unit, and a communication control interface. Therefore, the detailed description of the hardware configuration of the user terminal 40 is omitted.

The multi-language translation server 50 has a function of translating a character string for on-screen text acquired from the moving picture editing server 10 into one or more other languages with respect to the text data. For example, the multi-language translation server 50 may store dictionary information for translation in a dictionary database (not illustrated) in advance. The multi-language translation server 50 accepts a translation request for a character string for on-screen text from the moving picture editing server 10, and acquires text data of the character string. The multi-language translation server 50 translates the character string into another language with reference to the translation dictionary information as necessary, and then transmits text data representing the translated character string to the moving picture editing server 10.

For the multi-language translation server 50, it is also possible to use a server provided by an existing multi-language translation service. The existing multi-language translation service is not particularly limited, and examples thereof include Google (registered trademark) Translation.

<Moving Picture Editing Server>

Next, a functional configuration of the moving picture editing server 10 will be described below.

As illustrated in FIG. 4, the moving picture editing server 10 includes, in a functional concept, at least a control unit 101, a storage unit 102, and an interface unit 103. FIG. 4 is a block diagram illustrating an example of the functional configuration of the moving picture editing server 10.

The control unit 101 includes an internal memory for storing a control program such as an operating system (OS), a program defining various process procedures, and necessary data. The control unit 101 performs information processing for executing various processes using these programs and the like. As illustrated in FIG. 4, the control unit 101 includes, in a functional concept, at least a first editing screen display unit 111, a text object placement unit 112, a first on-screen text display unit 113, an object placement unit 114, a text object display unit 115, a text object editing unit 116, a second on-screen text display unit 117, a voice synthesis unit 118, and a voice output unit 119.

The first editing screen display unit 111 displays a first moving picture editing screen 130 on the administrator terminal 30. As illustrated in FIG. 5, the first moving picture editing screen 130 includes at least a moving picture playback area 131 for playing back a moving picture and a timeline display area 132 for displaying a timeline for a playback time of the moving picture. FIG. 5 is an explanatory view illustrating the first moving picture editing screen 130.

The moving picture playback area 131 plays back and displays a moving picture on the basis of moving picture data stored in the storage unit 102 of the moving picture editing server 10. The timeline display area 132 displays the timeline for the playback time of the moving picture. The timeline display area 132 also has a text object placement area 133 that enables the placement of a first text object 135 and an object placement area 134 that enables the placement of an object 136 (details thereof will be described later.).

The timeline display area 132 represents the temporal passage of the playback time toward the direction indicated by the arrow X in FIG. 5. A playback time display line 137 indicating the current playback time position is also displayed in the timeline display area 132. When the moving picture is played back, the playback time display line 137 horizontally moves in the direction indicated by the arrow X with the temporal passage of the playback time. When the moving picture playback is paused, the playback time display line 137 stops the horizontal movement at the pausing time. Then, from the positional relationship between the playback time display line 137 and the first text object and the object to be described later, it is possible to easily confirm which first text object a first on-screen text 138 is based on or which object a second on-screen text is based on, the first on-screen text 138 or the second on-screen text being currently superimposed and displayed in the moving picture. For example, when the horizontally moving playback time display line 137 is displayed to overlap the first text object, the character string input in the first text object is superimposed and displayed as the first on-screen text 138 on the moving picture.

In response to a request from the administrator terminal 30, the text object placement unit 112 makes it possible to easily edit the playback time and the end time of the first on-screen text to be superimposed and displayed during the moving picture playback, and the content to be displayed as the first on-screen text.

That is, the text object placement unit 112 accepts the placement of at least one first text object 135 at an arbitrary position in the text object placement area 133 in response to a request from the administrator terminal 30. Further, the text object placement unit 112 accepts the movement of the placed first text object 135 in the text object placement area 133 and the expansion and contraction of the area of the first text object 135 in response to a request from the administrator terminal 30. Here, the position of the left end of the first text object 135 placed in the text object placement area 133 corresponds to the start time at which the character string input as text in the first text object 135 is superimposed and displayed in the moving picture being played back as the first on-screen text 138. The position of the right end of the first text object 135 corresponds to the time at which the superimposed display of the first on-screen text 138 in the moving picture ends. Therefore, the administrator can easily adjust the start time and the end time (superimposed display time) of the first on-screen text to be superimposed and displayed on the moving picture being played back only by moving the first text object 135 in the text object placement area 133 or expanding or contracting the area of the first text object 135. Note that the first text object 135 can also be moved, expanded, and contracted by the input means of the administrator terminal 30, specifically, for example, a mouse or the like. The area of the first text object 135 is expanded and contracted, for example, in the direction indicated by the arrow X indicating the timeline for the playback time of the moving picture in the text object placement area 133, or in the opposite direction.

In addition, the text object placement unit 112 accepts the input of text data representing a character string into the first text object 135 by the input means of the administrator terminal 30. Moreover, the text object placement unit 112 can also accept the multi-language translation of the character string input in the first text object 135 in response to a request from the administrator terminal 30. In this case, the text object placement unit 112 transmits the text data representing the character string input in the first text object 135 to the multi-language translation server 50, and accepts the text data representing the translated character string translated by the multi-language translation server 50. Note that the text data representing a character string includes character information, numerical information, symbol information, and information obtained by combining these pieces of information.

When the first text object 135 is placed in the text object placement area 133, the text object placement unit 112 stores the first on-screen text information in an on-screen text information database (details will be described later.) in association with the moving picture data. In addition to the start time information and the end time information of the superimposed display of the first on-screen text 138, the first on-screen text information includes the text data representing a character string input to the first text object 135, the text data representing a translated character string, graphic information, and voice information. The first on-screen text information may also include information related to the display position of the first on-screen text 138 in the moving picture.

The first on-screen text display unit 113 reads the first on-screen text information stored in the on-screen text information database, and superimposes and displays the first on-screen text 138 on an arbitrary position of the moving picture being played back on the basis of the first on-screen text information. The character string displayed as the first on-screen text 138 is generated on the basis of the text data representing the character string input to the first text object 135 included in the first on-screen text information or the text data representing the translated character string. In addition, in the superimposed display of the first on-screen text 138, the superimposed display is started and ended at a predetermined playback time on the basis of the start time information and the end time information of the superimposed display of the first on-screen text 138 included in the first on-screen text information. When a plurality of first text objects 135 are placed in the text object placement area 133 by the text object placement unit 112, the first on-screen text display unit 113 sequentially reads the first on-screen text information stored in the on-screen text information database, and superimposes and displays the character string of the text data input to each of the first text objects 135 as the first on-screen text 138 at a predetermined playback time.

The object placement unit 114 accepts the placement of at least one object 136 at an arbitrary position in the object placement area 134 in response to a request from the administrator terminal 30. By enabling the object 136 to be freely placed in the object placement area 134, the administrator can visually manage the object 136. As a result, it is possible to avoid complicated management even when a large number of objects 136 are placed, and it is possible to improve operability and work efficiency such that it is possible to easily find the object 136 to be edited even in a case where the administrator edits the object 136. Further, the object placement unit 114 accepts the movement of the placed object 136 in the object placement area 134 and the expansion and contraction of the area of the object 136 in response to a request from the administrator terminal 30. Here, the position of the left end of the object 136 placed in the object placement area 134 corresponds to the start time at which the second on-screen text (or a second text object 139) is superimposed and displayed in the moving picture being played back. The position of the right end of the object 136 corresponds to the time at which the superimposed display of the second on-screen text (or second text object 139) in the moving picture being played back is ended. Therefore, the administrator can easily adjust the start time and the end time (superimposed display time) of the second on-screen text to be superimposed and displayed on the moving picture being played back only by moving the object 136 in the object placement area 134 or expanding or contracting the area of the object 136. Note that the movement of the object 136 and the expansion and contraction of the area of the object 136 can be performed by the input means of the administrator terminal 30, specifically, for example, a mouse or the like. The area of the object 136 can be expanded and contracted, for example, in a direction indicated by the arrow X indicating the timeline for the playback time of the moving picture in the object placement area 134, or in the opposite direction. The object placement unit 114 can place a plurality of objects 136 in parallel in a direction perpendicular to the timeline for the playback time of the moving picture. As a result, during the moving picture playback, two or more text objects 139 can be simultaneously superimposed and displayed at the same playback time. Note that, unlike the text object placement unit 112, the object placement unit 114 does not accept the input of text data representing a character string in response to a request from the administrator terminal 30.

When at least one object 136 is placed in the object placement area 134, the object placement unit 114 stores the start time information and the end time information of the superimposed display of the second text object 139 in the on-screen text information database in association with the moving picture data as the second on-screen text information. The start time information and the end time information of the superimposed display of the second text object 139 are the start time information and the end time information of the superimposed display of the second on-screen text.

When at least one object 136 is placed in the object placement area 134 by the object placement unit 114, the text object display unit 115 superimposes and displays the second text object 139 on the moving picture being edited at the playback time corresponding to the position where the object 136 is placed. The second text object 139 is an object to which text data representing a character string can be input by the input means of the administrator terminal 30. The text object display unit 115 does not superimpose or display the second text object 139 in moving picture playback without moving picture editing. Note that the text object display unit 115 calls the second on-screen text information stored in the on-screen text information database, and the superimposed display of the second text object 139 is executed on the basis of the start time information and the end time information of the superimposed display of the second text object 139 included in the second on-screen text information.

The text object editing unit 116 accepts the input of text data (character information, numerical information, symbol information, and information in which character information, numerical information, and symbol information are combined) representing a character string into the second text object 139 by the input means of the administrator terminal 30. Moreover, the text object editing unit 116 accepts the multi-language translation of the character string input in the second text object 139 in response to a request from the administrator terminal 30. In this case, the text object editing unit 116 transmits text data representing the character string input in the second text object 139 to the multi-language translation server 50, and accepts (receives) text data representing the translated character string translated by the multi-language translation server 50.

Further, the text object editing unit 116 accepts the movement of the display position of the second text object 139 in the moving picture and the expansion and contraction of the area of the second text object 139 in response to a request from the administrator terminal 30. By moving the second text object 139, the second on-screen text can be moved to an arbitrary position in the moving picture and superimposed and displayed. Moreover, the text object editing unit 116 accepts a change in the second text object 139 in terms of the shape, the color to be displayed, and the font, character size, and the like of the character string input as text in response to a request from the administrator terminal 30.

The text object editing unit 116 includes, in the second on-screen text information, information related to the display position of the second on-screen text (second text object 139) in the moving picture, information related to the shape, the color to be displayed, and the like of the second text object 139, the text data representing the character string input to the second text object 139, the text data representing the translated character string, information related to the font, character size, and the like of the character string input to the second text object 139, and stores the information in the on-screen text information database.

The second on-screen text display unit 117 reads the second on-screen text information stored in the on-screen text information database, and superimposes and displays the second on-screen text on the moving picture being played back on the basis of the second on-screen text information. The second on-screen text is generated on the basis of the information on the placement position, the area, the shape, the color, and the like of the second text object 139 included in the second on-screen text information, the text data representing the character string input to the second text object 139 included in the second on-screen text information, the text data representing the translated character string, or the like. In addition, in the superimposed display of the second on-screen text, the superimposed display is started and ended at a predetermined playback time on the basis of the start time information and the end time information of the superimposed display of the second text object 139 included in the second on-screen text information. When a plurality of objects 136 is placed in the object placement area 134 by the object placement unit 114, the second on-screen text display unit 117 reads the second on-screen text information stored in the on-screen text information database, and superimposes and displays the plurality of second on-screen texts sequentially or at the same time.

The voice synthesis unit 118 reads sound information for voice synthesis stored in a voice database (details will be described later), and generates a synthesized voice corresponding to the text data representing the character string input to the first text object 135 or the text data representing the translated character string. Note that the voice synthesis unit 118 may store the data of the generated synthesized voice in the on-screen text information database in association with the first on-screen text information.

The voice output unit 119 outputs the voice synthesized by the voice synthesis unit 118 in synchronization with the superimposed display of the first on-screen text 138 by the first on-screen text display unit 113. When the data of the synthesized voice is stored in the on-screen text information database in association with the first on-screen text information, the voice output unit 119 may read the data of the synthesized voice from the on-screen text information database and output the data during the superimposed display of the first on-screen text 138.

The storage unit 102 includes, for example, a plurality of storage areas defined therein, and includes at least a moving picture database 121, an on-screen text information database 122, and a voice database 123. As the storage unit 102, a storage medium such as a hard disk for storing data and programs for storage can be used.

The moving picture database 121 stores material moving picture data. The material moving picture data includes moving picture data that is used as material before moving picture editing.

The on-screen text information database 122 stores first on-screen text information and/or second on-screen text information associated with the material moving picture data stored in the moving picture database 121.

The voice database 123 stores sound information for voice synthesis. Here, the "sound information" is information necessary for synthesizing a voice, and can include phoneme data for outputting a synthesized sound for a short sound, a word, a phrase unit, or the like.

The interface unit 103 enables input and output through the generation of a web page, transfers the web page on the network 20, and displays the web page on the administrator terminal 30 and the user terminal 40 using a web browser. In more detail, these operations are implemented by a common gateway interface (CGI) script. The CGI is an interface that activates a corresponding program, that is, a CGI script on the WWW server side in response to a request transmitted from a browser of a client and returns a result obtained by the program to the client side. The CGI script is stored in the memory. When the HTML document is transmitted from the moving picture editing server 10 connected to the Internet to the administrator terminal 30 and the user terminal 40, a hypertext transport protocol (HTTP) is adopted as a protocol. This enables moving picture editing using a general-purpose web browser or the like in the administrator terminal 30, such as a personal computer or a smartphone, and enables playback of an edited moving picture or the like in the user terminal 40.

[Operation of Moving Picture Editing System]

Next, the operation of the moving picture editing system according to the present Embodiment 1 will be described.

Various operations such as a moving picture editing process in the moving picture editing system are implemented by a moving picture editing program that is included in the storage unit 102 of the moving picture editing server 10 to implement the function of each component such as the first editing screen display unit 111 in the control unit 101. Here, the moving picture editing program includes codes for performing various operations described below, and implements the functions of the respective components.

<Moving Picture Editing Process>

First, a moving picture editing process using the moving picture editing system of the present Embodiment 1 will be described with reference to FIGS. 6 to 9. FIG. 6 is a flowchart illustrating a flow of a moving picture editing process performed by the administrator. FIG. 7 is a flowchart illustrating a flow of a first on-screen text editing process in the moving picture editing process. FIG. 8 is a flowchart illustrating a flow of a second on-screen text editing process in the moving picture editing process. FIG. 9 is an explanatory view illustrating how the second text object is edited in the first moving picture editing screen.

As illustrated in FIG. 6, to use the moving picture editing system of the present Embodiment 1, the administrator first accesses the moving picture editing server 10 from the administrator terminal 30 via the network 20. When the moving picture editing server 10 is accessed, the first editing screen display unit 111 of the moving picture editing server 10 transmits data of an HTML document for displaying the first moving picture editing screen 130 to the administrator terminal 30. As a result, the first moving picture editing screen 130 is displayed on the display or the like of the administrator terminal 30 (S101).

On the first moving picture editing screen 130, the administrator selects and calls a material moving picture to be subjected to moving picture editing from the material moving picture data stored in the moving picture database 121 using an input means such as a keyboard or a mouse provided in the administrator terminal 30. The first editing screen display unit 111 displays the material moving picture in the moving picture playback area 131 in response to a request from the administrator terminal 30 (S102).

Next, when the administrator performs the first on-screen text editing process (S103, S104), as illustrated in FIG. 7, the text object placement unit 112 accepts the placement of at least one first text object 135 at an arbitrary position in the text object placement area 133 in response to a request from the administrator terminal 30 (S103, S104). Specifically, at least one first text object 135 is added to an arbitrary position in the text object placement area 133 using the input means such as the keyboard or the mouse provided in the administrator terminal 30 (S201). Subsequently, when it is desired to adjust the time at which the first on-screen text 138 is superimposed and displayed on the moving picture being played back, the placement position of the first text object 135 is moved using the input means of the administrator terminal 30. Moreover, when the time for the superimposed display of the first on-screen text is adjusted, the area of the first text object 135 is expanded or contracted using the input means of the administrator terminal 30 (S202).

Then, the text object placement unit 112 accepts the input of text data representing a character string into the first text object 135 by the input means of the administrator terminal 30 (S203). At least a part of the input character string is displayed in the first text object 135, so that the administrator can easily determine the association between the placed first text object 135 and the first on-screen text. The character string input in first text object 135 can be translated into another language (S204). In this case, the text object placement unit 112 transmits the text data representing the character string input in the first text object 135 to the multi-language translation server 50 (S205). When the translation into another language is performed by the multi-language translation server 50, and the text data representing the translated character string is transmitted from the multi-language translation server 50, the text object placement unit 112 displays the translated character string into another language in the first text object 135 (S206). Note that the character string into the first text object 135 can be translated into another language even during the moving picture playback, and the playback does not necessarily need to be stopped.

Moreover, when the storage of the edited moving picture data is requested by the administrator terminal 30, the text object placement unit 112 associates, as the first on-screen text information, the start time information and the end time information of the superimposed display of the first on-screen text 138, the text data representing the character string input to the first text object 135, and the text data representing the translated character string with the material moving picture data, and stores the associated information in the on-screen text information database 122 (S207). This ends the first on-screen text editing process.

Subsequently, when the second on-screen text editing process (S105, S106) is performed, as illustrated in FIG. 8, the object placement unit 114 accepts the placement of at least one object 136 at an arbitrary position in the object placement area 134 in response to a request from the administrator terminal 30 (S301). Specifically, at least one object 136 is added to an arbitrary position in the object placement area 134 using the input means such as the keyboard or the mouse provided in the administrator terminal 30. Then, when it is desired to adjust the time at which the second on-screen text is superimposed and displayed on the moving picture being played back, the placement position of the object 136 is moved using the input means of the administrator terminal 30. Moreover, when the time for the superimposed display of the second on-screen text is adjusted, the area of the object 136 is expanded or contracted using the input means of the administrator terminal 30 (S302).

When the object 136 is placed by the object placement unit 114, the text object display unit 115 superimposes and displays the second text object 139 on the moving picture being edited at the playback time corresponding to the position where the object 136 is placed (S304).

Subsequently, the text object editing unit 116 accepts the input of text data representing a character string into the second text object 139 in response to a request from the administrator terminal 30 (S305). At least a part of the input character string is also displayed in the object 136. This enables the administrator to easily determine the association among the placed object 136, the second text object 139 and the second on-screen text. In addition, in response to a request from the administrator terminal 30, the text object editing unit 116 moves the display position of the second text object 139 in the moving picture, or expands or contracts the area of the second text object 139. By moving the second text object 139, the second on-screen text can be superimposed and displayed at an arbitrary position in the moving picture to be played back. The display area of the second on-screen text can be expanded or contracted by expanding or contracting the area of the second text object 139.

Moreover, as illustrated in FIG. 9, the text object editing unit 116 can change the second text object 139 in terms of the shape, the color to be displayed, and the font, character size, and the like of the character string input as text in response to a request from the administrator terminal 30. The second text object 139 can be edited, for example, by the text object editing unit 116 displaying an editing palette 140 having a graphical user interface (GUI) function on the first moving picture editing screen 130. The editing palette 140 includes an icon (button) for changing the shape and color of the second text object 139, an icon (button) for changing the font, color, and size of the character string input in the second text object 139, and the like.

In response to a request from the administrator terminal 30, the text object editing unit 116 also accepts the translation of the character string input in the second text object 139 into another language (S306). In this case, the text object editing unit 116 transmits the text data representing the character string input in the second text object 139 to the multi-language translation server 50 (S307). When the translation into another language is performed by the multi-language translation server 50, and the text data representing the translated character string is transmitted from the multi-language translation server 50, the text object editing unit 116 displays the translated character string into another language in the second text object 139 (S308). Note that the character string input in second text object 139 can be translated into another language even during the moving picture playback, and does not necessarily need to be stopped.

Further, when the storage of the edited moving picture data is requested by the administrator terminal 30, the text object editing unit 116 stores the second on-screen text information in the on-screen text information database 122 (S309), whereby the second on-screen text editing process. The second on-screen text information includes information related to the display position of the second on-screen text (second text object 139) in the moving picture, information related to the shape, the color to be displayed, and the like of the second text object 139, the text data representing the character string input to the second text object 139, the text data representing the translated character string, information related to the font, character size, and the like of the character string input to the second text object 139, and the like.

<On-Screen Text Display Processing>

Next, an on-screen text display process when the edited moving picture is played back will be described. FIG. 10 is a flowchart illustrating a flow of a first on-screen text display process during edited moving picture playback. FIG. 11 is a flowchart illustrating a flow of a second on-screen text display process during edited moving picture playback.

First, the first on-screen text display process will be described. As illustrated in FIG. 10, moving picture data to be played back is selected and called from the material moving picture data stored in the moving picture database 121, and the moving picture is played back (S401). Since the first on-screen text information is associated with the selected moving picture data, the first on-screen text display unit 113 reads the first on-screen text information stored in the on-screen text information database 122 (S402). Then, on the basis of the start time information of the superimposed display of the first on-screen text included in the first on-screen text information, the first on-screen text display unit 113 superimposes and displays the first on-screen text 138 on the moving picture being played back (S403). Further, the voice synthesis unit 118 reads sound information for voice synthesis stored in the voice database 123, and generates a synthesized voice corresponding to the text data representing the character string input to the first text object 135 or the text data representing the translated character string. Moreover, the voice output unit 119 outputs the voice synthesized by the voice synthesis unit 118 in synchronization with the superimposed display of the first on-screen text 138 (S404). Thereafter, the superimposed display of the first on-screen text 138 is ended on the basis of the end time information of the superimposed display of the first on-screen text included in the first on-screen text information (S405). This ends the display process of the first on-screen text.

Next, the second on-screen text display process will be described. First, as illustrated in FIG. 11, as in the case of the first on-screen text display process, moving picture data is selected from the material moving picture data stored in the moving picture database 121, and the moving picture is played back (S501). Since the second on-screen text information is associated with the selected moving picture data, the second on-screen text display unit 117 reads the second on-screen text information stored in the on-screen text information database 122 (S502). Then, the second on-screen text display unit 117 superimposes and displays the second on-screen text on the moving picture being played back on the basis of the start time information of the superimposed display of the second on-screen text included in the second on-screen text information (S503). Thereafter, the superimposed display of the second on-screen text is ended on the basis of the end time information of the superimposed display of the second on-screen text included in the second on-screen text information (S504). This ends the display process of the second on-screen text.

As described above, according to the moving picture editing system of the present invention, moving picture editing with a high degree of freedom can be performed by an extremely simple method, and an on-screen text can be easily superimposed and displayed on a moving picture being played back without having specific specialized knowledge, techniques, or the like. It is also possible to output a synthesized voice during the superimposed display of the on-screen text or to perform the translation and display thereof into another language. As a result, the moving picture editing system of the present invention is extremely useful for, for example, a work manual using a moving picture for technical instruction or the like to foreign workers.

Embodiment 2

[Moving Picture Editing System]

Next, a moving picture editing system according to Embodiment 2 of the present invention will be described below.

The moving picture editing system according to the present Embodiment 2 differs from Embodiment 1 in enabling cut editing and the generation of a composite moving picture with simplicity and greatly improved workability for a material moving picture before on-screen text editing. More details are as follows. In the following description, components having functions similar to those of the moving picture editing system according to Embodiment 1 and steps of performing the same processes as those of the moving picture editing method according to Embodiment 1 are denoted by the same reference numerals, and detailed description thereof may be omitted.

<Overall Configuration of Moving Picture Editing System>

The overall configuration of the moving picture editing system according to the present Embodiment 2 is similar to the case of Embodiment 1, in which a moving picture editing server, an administrator terminal, a user terminal, and a multi-language server are communicably connected to each other via a network (cf. FIG. 1). The hardware configurations of the moving picture editing server, the administrator terminal, the user terminal, and the multi-language server can also adopt the same configurations as those in the present Embodiment 1 (cf. FIGS. 2 and 3). Therefore, a detailed description of these hardware configurations will be omitted.

<Moving Picture Editing Server>

A detailed configuration of the moving picture editing server according to the present Embodiment 2 will be described with reference to FIG. 12. FIG. 12 is a block diagram illustrating a configuration of a moving picture editing server 10'. As illustrated in the drawing, the moving picture editing server 10' includes, in a functional concept, at least a control unit 101', a storage unit 102, and an interface unit 103.

As illustrated in FIG. 12, the control unit 101' differs from the control unit 101 according to Embodiment 1 in including a second editing screen display unit 124, a cut editing unit 125, and a composite moving picture generation unit 126.

The second editing screen display unit 124 displays a second moving picture editing screen 150 on the administrator terminal 30 in response to a request from the administrator terminal 30. As illustrated in FIG. 13, the second moving picture editing screen 150 includes at least a material moving picture display area 151, a frame image display area 152, and a composite moving picture playback area 153 for playing back a composite moving picture. Note that FIG. 13 is an explanatory view illustrating the second moving picture editing screen 150.

The material moving picture display area 151 can display at least one material moving picture 154. The material moving picture 154 is based on the material moving picture data stored in the moving picture database 121 of the storage unit 102, and is called by the second editing screen display unit 124 in response to a request from the administrator terminal 30. In addition, the material moving picture display area 151 can display not only the material moving picture 154 but also a (still) image and a composite moving picture being edited (details will be described later.).

The frame image display area 152 displays a plurality of frame images 155 placed in chronological order. The frame image 155 constitutes the material moving picture 154 displayed in the material moving picture display area 151. When a plurality of material moving pictures are selected and displayed in the material moving picture display area 151, for example, as illustrated in FIG. 13, a plurality of frame images 155 constituting the corresponding material moving picture are displayed in chronological order in each of a first frame image display area 152a and a second frame image display area 152b. Moreover, the frame image display area 152 displays a playback position display line 156 to be superimposed on the plurality of frame images 155 placed and displayed in chronological order. The playback position display line 156 indicates which frame image 155 is played back and displayed at which playback time in the material moving picture being played back. When the material moving picture is played back, the playback position display line 156 horizontally moves in the direction indicated by the arrow Y with the temporal passage of the playback time. In addition, when the playback of the material moving picture is paused, the playback position display line 156 stops the horizontal movement at the pausing time. Then, from the positional relationship of the playback position display line 156 in the frame image display area 152, it is possible to easily confirm which frame image is being played back as a moving picture. Note that the direction indicated by the arrow Y illustrated in FIG. 13 represents the temporal passage of the playback time of the material moving picture.

The composite moving picture playback area 153 is an area for displaying a composite moving picture, and includes at least a first moving picture playback area 153a and a second moving picture playback area 153b. In the first moving picture playback area 153a, the first material moving picture cut and edited in the first frame image display area 152a can be played back. In the second moving picture playback area 153b, the second material moving picture cut and edited in the second frame image display area 152b can be played back. In the present specification, the "composite moving picture" means a moving picture with a plurality of material moving pictures played back in synchronization in one screen. In the composite moving picture of the present embodiment, a case where the first material moving picture and the second material moving picture are synchronously played back is taken as an example.

The cut editing unit 125 performs cut editing by specifying a section (range) of a frame image to be played back as a moving picture among a plurality of frame images constituting the material moving picture data. Specifically, the cut editing unit 125 places at least one object 157 at an arbitrary position in the frame image display area 152 in response to a request from the administrator terminal 30. As a result, the object 157 can be superimposed and displayed on the frame images 155 placed and displayed in chronological order in the frame image display area 152. Here, the object 157 specifies a section (range) of only frame images necessary for moving picture playback among a plurality of frame images displayed in chronological order in the frame image display area 152. Then, a section that is not specified by the object 157 is excluded so that no moving picture is played back in the section. This enables the administrator to easily perform cut editing by simply superimposing and displaying a plurality of objects 157 on the frame images 155 placed in chronological order.

Further, the cut editing unit 125 accepts the movement of the placed object 157 in the frame image display area 152 and the expansion and contraction of the area of the object 157 in response to a request from the administrator terminal 30. As a result, the administrator can change the playback portion of the material moving picture only by moving the object 157 in the frame image display area 152. In addition, the playback time can be appropriately adjusted only by expanding or contracting the area of the object 157. Note that the area of the object 157 can be expanded and contracted, for example, in the horizontal direction (a direction parallel to the direction indicated by the arrow Y in FIG. 13) in the frame image display area 152.

Moreover, when the expansion and contraction of the area of the object 157 are performed on one arbitrary material moving picture constituting the composite moving picture, the cut editing unit 125 can similarly reflect the expansion and contraction on other material moving pictures played back in synchronization. For example, when the specified section of the frame image constituting the first material moving picture is expanded, the specified section of the frame image played back in synchronization with the specified section in the second material moving picture can be expanded, similarly to the first material moving picture.

The cut editing unit 125 can also specify a plurality of different sections in the frame image display area 152 using a plurality of objects. In FIG. 13, in the second frame image display area 152b, three different sections are specified using objects 157a to 157c. In such a case, the cut editing unit 125 can arbitrarily change and set the playback order of each specified section. For example, the setting can be made such that the section specified by the object 157c is played back after the section specified by the object 157a is played back, and then the section specified by the object 157b is played back.

Moreover, the cut editing unit 125 can store the material moving picture data after the cut editing in the moving picture database 121 in response to a request from the administrator terminal 30.

The composite moving picture generation unit 126 generates a composite moving picture in which each material moving picture can be synchronously played back in one screen in response to a request from the administrator terminal 30. The material moving picture stored in the moving picture database 121 is called by the second editing screen display unit 124 in response to a request from the administrator terminal 30 and displayed in the material moving picture display area 151. Further, the material moving picture is the material moving picture after the cut editing when the cut editing has been performed by the cut editing unit 125. FIG. 13 illustrates a composite moving picture in which the first material moving picture cut and edited in the first frame image display area 152a and the second material moving picture cut and edited in the second frame image display area 152b are combined. In addition, the composite moving picture generation unit 126 can store moving picture data regarding the composite moving picture in the moving picture database 121 in response to a request from the administrator terminal 30.

[Operation of Moving Picture Editing System]

Next, the operation of the moving picture editing system according to the present Embodiment 2 will be described.

Various operations such as a moving picture editing process in the moving picture editing system are implemented by a moving picture editing program that is included in the storage unit 102 of the moving picture editing server 10' to implement the function of each component such as the second editing screen display unit 124 of the control unit 101'. Here, the moving picture editing program includes codes for performing various operations described below, and implements the functions of the respective components.

<Composite Moving Picture Generation Process>

First, a composite moving picture editing process using the moving picture editing system according to the present Embodiment 2 will be described with reference to FIGS. 14 and 15. In the following description, a case of generating a composite moving picture including two material moving pictures will be described as an example. FIG. 14 is a flowchart illustrating a flow of a composite moving picture editing process performed by the administrator. FIG. 15 is a flowchart illustrating a flow of a cut editing process performed by the administrator.

As illustrated in FIG. 14, to use the moving picture editing system of the present Embodiment 2, the administrator first accesses the moving picture editing server 10' from the administrator terminal 30 via the network 20. When the moving picture editing server 10' is accessed, the second editing screen display unit 124 of the moving picture editing server 10' transmits data of an HTML document for displaying the second moving picture editing screen 150 to the administrator terminal 30. As a result, the second moving picture editing screen 150 is displayed on the display or the like of the administrator terminal 30 (S601).

Next, on the second moving picture editing screen 150, the administrator uses the input means such as the keyboard or the mouse provided in the administrator terminal 30 to select and call a plurality of pieces of material moving picture data to be used for generating a composite moving picture from the material moving picture data stored in the moving picture database 121. As a result, the second editing screen display unit 124 displays the respective material moving pictures based on the plurality of selected material moving picture data in the material moving picture display area 151 in response to a request from the administrator terminal 30 (S602).

Subsequently, when the administrator performs a cut editing process (S603, S604), as illustrated in FIG. 15, the cut editing unit 125 accepts the selection of a material moving picture to be subjected to the cut editing process in response to a request from the administrator terminal 30 (S701). For example, when two of the first material moving picture and the second material moving picture are selected as the material moving pictures constituting the composite moving picture, as illustrated in FIG. 13, the frame images constituting the first material moving picture are placed and displayed in chronological order in the first frame image display area 152a, and the frame images constituting the second material moving picture are placed and displayed in chronological order in the second frame image display area 152b.

Next, a section in which the moving picture is to be played back is specified by superimposing and displaying the object 157 on the first frame image display area 152a or the second frame image display area 152b. That is, when the icon 158 of "Add cut" illustrated in FIG. 13 is selected, the cut editing unit 125 accepts a request for the superimposed display of the object 157 from the administrator terminal 30. Moreover, the cut editing unit 125 superimposes and displays the object 157 on the plurality of frame images 155 displayed in each of the first frame image display area 152a and the second frame image display area 152b (S702).

The section (specified section) in which the moving picture is to be played back can be moved by appropriately moving the superimposed and displayed object 157 in the horizontal direction in the first frame image display area 152a or the second frame image display area 152b in response to a request from the administrator terminal 30. In addition, a section in which the moving picture is to be played back can be expanded or contracted by expanding or contracting the area of the object 157 in response to a request from the administrator terminal 30 (S703). Thereby, the cut editing for extracting only a section to be played back in the material moving picture is performed.

In addition, when it is desired to perform playback in synchronization with the same playback time, it is possible to associate a section specified by the object in the first frame image display area 152a with a section specified by the object in the second frame image display area 152b. As a result, when the section specified in the first frame image display area 152a is expanded or contracted, the section specified in the second frame image display area 152b can also be expanded or contracted in synchronization.

In a case where the composite moving picture is generated after the end of the cut editing, an icon 160 of "Generate moving picture" illustrated in FIG. 13 is selected. Thereby, the composite moving picture generation unit 126 accepts the request from the administrator terminal 30, and generates composite moving picture data in which the first material moving picture and the second material moving picture after the cut editing are respectively played back in synchronization with the same playback time in one screen (S607). In the stored composite moving picture data, the frame images played back in synchronization with the same playback time are associated with the first material moving picture and the second material moving picture. Moreover, when an icon 159 of "Save" illustrated in FIG. 13 is selected, the composite moving picture generation unit 126 accepts the saving of the composite moving picture data and stores the composite moving picture data in the moving picture database 121. This ends the composite moving picture editing process.

Note that the moving picture editing process and the on-screen text display process described in Embodiment 1 can be further executed on the composite moving picture generated by the composite moving picture editing process.

DESCRIPTION OF REFERENCE SIGNS 10, 10' . . . Moving picture editing server, 11 . . . CPU, 12 . . . ROM, 13 . . . RAM, 14 . . . Communication control interface, 15 . . . Storage device, 16 . . . Input operation unit, 20 . . . Network, 30 . . . Administrator terminal, 31 . . . CPU, 32 . . . ROM, 33 . . . RAM, 34 . . . Display unit, 35 . . . Input unit, 36 . . . Communication control interface, 40 . . . User terminal, 50 . . . Multi-language translation server, 101, 101' . . . Control unit, 102 . . . Storage unit, 103 . . . Interface unit, 111 . . . First editing screen display unit, 112 . . . Text object placement unit, 113 . . . First on-screen text display unit, 114 . . . Object placement unit, 115 . . . Text object display unit, 116 . . . Text object editing unit, 117 . . . Second on-screen text display unit, 118 . . . Voice synthesis unit, 119 . . . Voice output unit, 121 . . . Moving picture database, 122 . . . Moving picture database, 123 . . . Voice database, 124 . . . Second editing screen display unit, 125 . . . Cut editing unit, 126 . . . Composite moving picture generation unit, 130 . . . First moving picture editing screen, 131 . . . Moving picture playback area, 132 . . . Timeline display area, 133 . . . Text object placement area, 134 . . . Object placement area, 135 . . . First text object, 136 . . . Object, 137 . . . Playback time display line, 138 . . . First on-screen text, 139 . . . Second text object, 150 . . . Second moving picture editing screen, 151 . . . Material moving picture display area, 152 . . . Frame image display area, 153 . . . Composite moving picture playback area, 154 . . . Material moving picture, 155 . . . Frame image, 157 . . . Object

The invention claimed is:

1. A moving picture editing system comprising at least:
an administrator terminal; and
a moving picture editing server connected to the administrator terminal via a network,
wherein the moving picture editing server includes:
a first editing screen display unit that causes the administrator terminal to display a first moving picture editing screen including at least a moving picture playback area in which a moving picture is played back and a timeline display area in which a timeline for a playback time of the moving picture is displayed;
a text object placement unit that places at least one first text object at an arbitrary position in the timeline display area according to a request from the administrator terminal, and accepts text data representing a character string input to the first text object; and
a first on-screen text display unit that superimposes and displays the character string on the moving picture being played back as a first on-screen text at a playback time of the moving picture corresponding to a position of the first text object placed in the timeline display area on a basis of the text data input to the first text object,
the text object placement unit adjusts a superimposed display time of the first on-screen text to be superimposed and displayed on the moving picture by expanding or contracting an area of the first text object placed at an arbitrary position in the timeline display area.

2. The moving picture editing system according to claim 1, wherein
the first editing screen display unit further displays an object placement area enabling placement of an object at an arbitrary position in the timeline display area on the administrator terminal, and
the moving picture editing server further includes
an object placement unit that places at least one object at an arbitrary position in the object placement area in response to a request from the administrator terminal,
a text object display unit that causes a second text object to be superimposed and displayed on the moving picture at a playback time of the moving picture corresponding to a position of the object placed in the object placement area,
a text object editing unit that accepts, in response to a request from the administrator terminal, an input of text data representing a character string into the second text object superimposed and displayed on the moving picture by the text object display unit, and
a second on-screen text display unit that superimposes and displays the character string accepted by the text object editing unit on the moving picture being played back as a second on-screen text at a playback time of the moving picture corresponding to a position of the second text object placed in the object placement area.

3. The moving picture editing system according to claim 2, further comprising a multi-language translation server connected to the moving picture editing server via the network,
wherein the text object placement unit and the text object editing unit transmit text data representing a character string input to the first text object or the second text object to the multi-language translation server,
the multi-language translation server translates the text data into at least one language different from a language of the character string on a basis of the text data received from the text object placement unit or the text object editing unit, and transmits text data representing the translated character string to the moving picture editing server, and
the first on-screen text display unit and the second on-screen text display unit each superimpose and display the translated character string as a first on-screen text or a second on-screen text on the moving picture being played back on a basis of text data representing the translated character string received from the multi-language translation server.

4. The moving picture editing system according to claim 3, wherein
the moving picture editing server further includes
a storage unit that stores sound information for voice synthesis,
a voice synthesis unit that reads the sound information stored in the storage unit and generates a synthesized voice corresponding to text data representing the character string input to the first text object or text data representing the translated character string, and
a voice output unit that outputs the voice synthesized by the voice synthesis unit in synchronization with a superimposed display of the first on-screen text by the first on-screen text display unit.

5. The moving picture editing system according to claim 2, wherein the object placement unit adjusts a superimposed display time of the second on-screen text to be superimposed and displayed on the moving picture by expanding or contracting an area of the object placed at an arbitrary position in the object placement area.

6. The moving picture editing system according to claim 4, wherein
the moving picture editing server further includes
a second editing screen display unit that calls material moving picture data stored in the storage unit, and causes the administrator terminal to display a second moving picture editing screen on which a plurality of frame images constituting the material moving picture data are placed and displayed in chronological order, and
a cut editing unit that specifies a range of a partial section including one or more frame images with respect to the plurality of frame images placed and displayed in chronological order on the second moving picture editing screen, to delete a section not subjected to range specification.

7. The moving picture editing system according to claim 6, wherein
the second editing screen display unit calls a plurality of pieces of the material moving picture data from the storage unit, and places and displays a plurality of frame images constituting the material moving picture data in chronological order, and
the moving picture editing server further includes a composite moving picture generation unit that generates, on a basis of the plurality of pieces of material moving picture data called by the second editing screen display unit, a composite moving picture in which each playback is performed in synchronization.

8. The moving picture editing system according to claim 7, wherein when a length of the section subjected to range specification is changed with respect to a plurality of frame images constituting one arbitrary material moving picture in the composite moving picture, the cut editing unit also synchronously changes a length of a section corresponding to the section subjected to range specification for a plurality of frame images constituting another material moving picture.

* * * * *